United States Patent
Shiozaki et al.

(10) Patent No.: US 8,143,745 B2
(45) Date of Patent: Mar. 27, 2012

(54) POWER TRANSMISSION CONTROL DEVICE, POWER TRANSMISSION DEVICE, POWER RECEIVING CONTROL DEVICE, POWER RECEIVING DEVICE, AND ELECTRONIC APPARATUS

(75) Inventors: Nobutaka Shiozaki, Nagoya (JP); Kota Onishi, Nagoya (JP); Masayuki Kamiyama, Nagoya (JP); Takahiko Nakashima, Gifu (JP)

(73) Assignee: Seiko Epson Corporation, Tokyo (JP)

( * ) Notice: Subject to any disclaimer, the term of this patent is extended or adjusted under 35 U.S.C. 154(b) by 83 days.

(21) Appl. No.: 12/500,323

(22) Filed: Jul. 9, 2009

(65) Prior Publication Data
US 2010/0013320 A1 Jan. 21, 2010

(30) Foreign Application Priority Data
Jul. 16, 2008 (JP) .................................. 2008-185409

(51) Int. Cl.
*H01F 27/42* (2006.01)
(52) U.S. Cl. .................. 307/104; 307/140; 307/150
(58) Field of Classification Search ................. 307/104, 307/140, 150
See application file for complete search history.

(56) References Cited

U.S. PATENT DOCUMENTS
2006/0287763 A1* 12/2006 Ochi et al. ................... 700/231

FOREIGN PATENT DOCUMENTS
| JP | A-2005-237155 | 9/2005 |
| JP | A 2006-60909 | 3/2006 |
| JP | A-2007-325339 | 12/2007 |

* cited by examiner

Primary Examiner — Robert L. Deberadinis
(74) Attorney, Agent, or Firm — Oliff & Berridge, PLC

(57) ABSTRACT

A power transmission control device provided in a power transmission device included in a contactless power transmission system that transmits power by electromagnetically coupling a primary coil and a secondary coil from the power transmission device to a power receiving device so as to supply the power to a load on the power receiving device. The power transmission control device includes a controller that controls the power transmission control device, and a register section. The register section includes a power receiving side information register that stores power receiving side information received from the power receiving device, and a power transmission side information register that stores power transmission side information. The controller performs at least one of an authentication processing of the power receiving device; a power transmission control of the contactless power transmission; and a communication processing between the power transmission device and the power receiving device based on the power receiving side information stored in the power receiving side information register and the power transmission side information stored in the power transmission side register.

15 Claims, 19 Drawing Sheets

| | Register | Content | Operation |
|---|---|---|---|
| POWER RECEIVING SIDE INFORMATION REGISTER (110) | POWER RECEIVING SIDE AUTHENTICATION INFORMATION REGISTER | STANDARD/COIL/SYSTEM INFORMATION FIRST FOREIGN OBJECT THRESHOLD (META) | RECEIVE IN NEGOTIATION |
| | POWER RECEIVING SIDE TRANSMISSION CONDITION INFORMATION REGISTER | DRIVING VOLTAGE (VF) DRIVING FREQUENCY (f1) | RECEIVE IN SETUP |
| | POWER RECEIVING SIDE COMMUNICATION CONDITION INFORMATION REGISTER | COMMUNICATION METHOD (method) COMMUNICATION PARAMETER (f2, SIGH2, LEVL, LEVH) | RECEIVE IN SETUP |
| | POWER RECEIVING SIDE ABNORMALITY DETECTION INFORMATION REGISTER | ABNORMALITY DETECTION THRESHOLD (METUP, LEAVE) | RECEIVE IN SETUP |
| | POWER RECEIVING SIDE CORRESPONDING FUNCTION INFORMATION REGISTER | POWER RECEIVING SIDE CORRESPONDING FUNCTION | RECEIVE IN SETUP |
| POWER TRANSMISSION SIDE INFORMATION REGISTER (111) | POWER TRANSMISSION SIDE AUTHENTICATION INFORMATION REGISTER | STANDARD/COIL/SYSTEM INFORMATION FIRST FOREIGN OBJECT THRESHOLD (META0) | TRANSMIT IN NEGOTIATION |
| | POWER TRANSMISSION SIDE TRANSMISSION CONDITION INFORMATION REGISTER | DRIVING VOLTAGE (VF0) DRIVING FREQUENCY (f01) | DEFAULT SETTING |
| | POWER TRANSMISSION SIDE COMMUNICATION CONDITION INFORMATION REGISTER | COMMUNICATION PARAMETER (f02, SIGH) | DEFAULT SETTING |
| | POWER TRANSMISSION SIDE ABNORMALITY DETECTION INFORMATION REGISTER | ABNORMALITY DETECTION THRESHOLD (METUP0, LEAVE0) | DEFAULT SETTING |
| | POWER TRANSMISSION SIDE CORRESPONDING FUNCTION INFORMATION REGISTER | POWER TRANSMISSION SIDE CORRESPONDING FUNCTION | TRANSMIT IN SETUP |

FIG. 4

| | | |
|---|---|---|
| POWER RECEIVING SIDE INFORMATION REGISTER | POWER RECEIVING SIDE AUTHENTICATION INFORMATION REGISTER | STANDARD/COIL/SYSTEM INFORMATION FIRST FOREIGN OBJECT THRESHOLD (META) | TRANSMIT IN NEGOTIATION |
| | POWER RECEIVING SIDE TRANSMISSION CONDITION INFORMATION REGISTER | DRIVING VOLTAGE (VF) DRIVING FREQUENCY (f1) | TRANSMIT IN SETUP |
| | POWER RECEIVING SIDE COMMUNICATION CONDITION INFORMATION REGISTER | COMMUNICATION METHOD (method) COMMUNICATION PARAMETER (f2, SIGH2, LEVL, LEVH) | TRANSMIT IN SETUP |
| | POWER RECEIVING SIDE ABNORMALITY DETECTION INFORMATION REGISTER | ABNORMALITY DETECTION THRESHOLD (METUP, LEAVE) | TRANSMIT IN SETUP |
| | POWER RECEIVING SIDE CORRESPONDING FUNCTION INFORMATION REGISTER | POWER RECEIVING SIDE CORRESPONDING FUNCTION | TRANSMIT IN SETUP |
| POWER TRANSMISSION SIDE INFORMATION REGISTER | POWER TRANSMISSION SIDE AUTHENTICATION INFORMATION REGISTER | STANDARD/COIL/SYSTEM INFORMATION | RECEIVE IN NEGOTIATION |
| | POWER TRANSMISSION SIDE CORRESPONDING FUNCTION INFORMATION REGISTER | POWER TRANSMISSION SIDE CORRESPONDING FUNCTION | RECEIVE IN SETUP |

130 — POWER RECEIVING SIDE INFORMATION REGISTER
131 — POWER TRANSMISSION SIDE INFORMATION REGISTER

FIG. 5

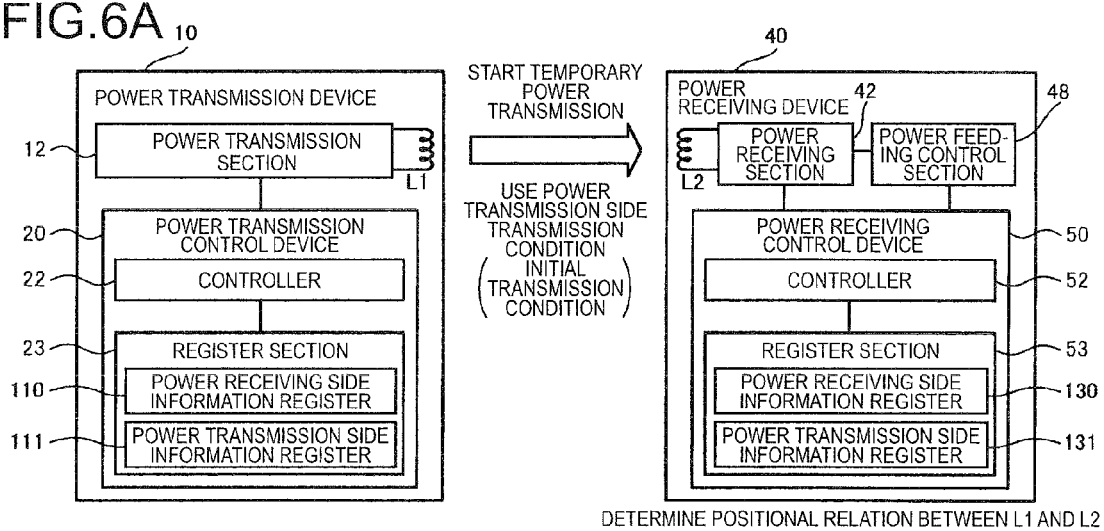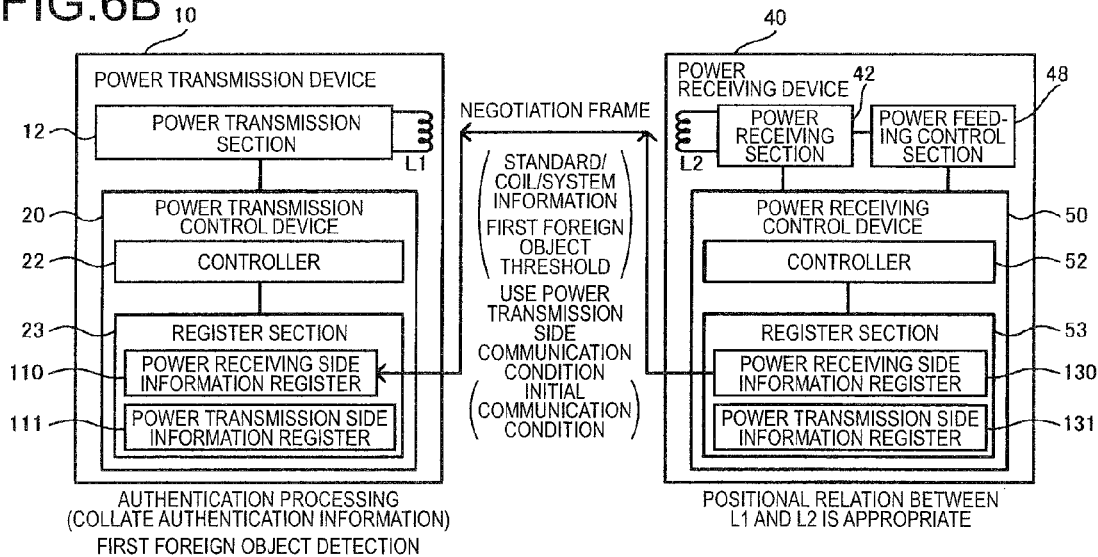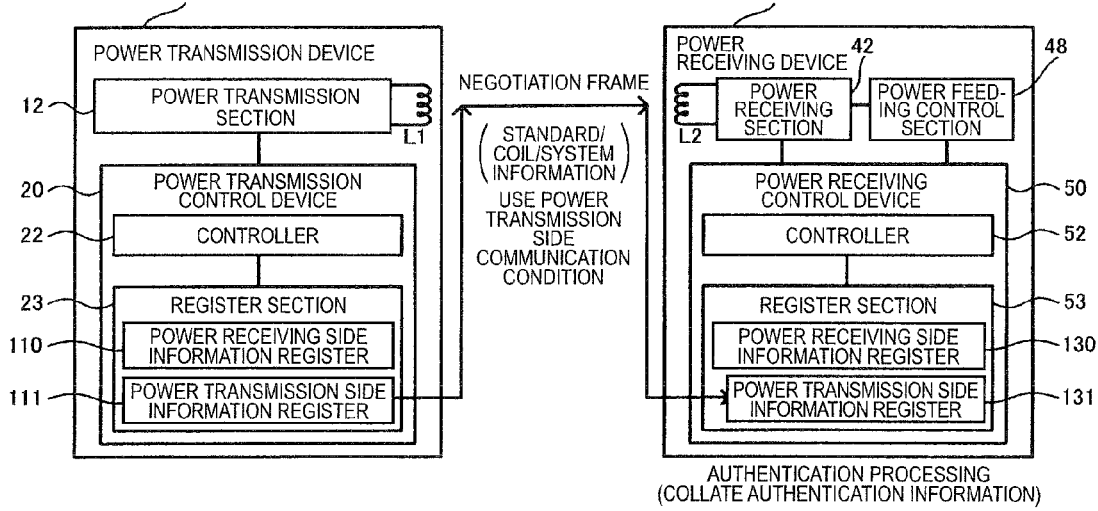

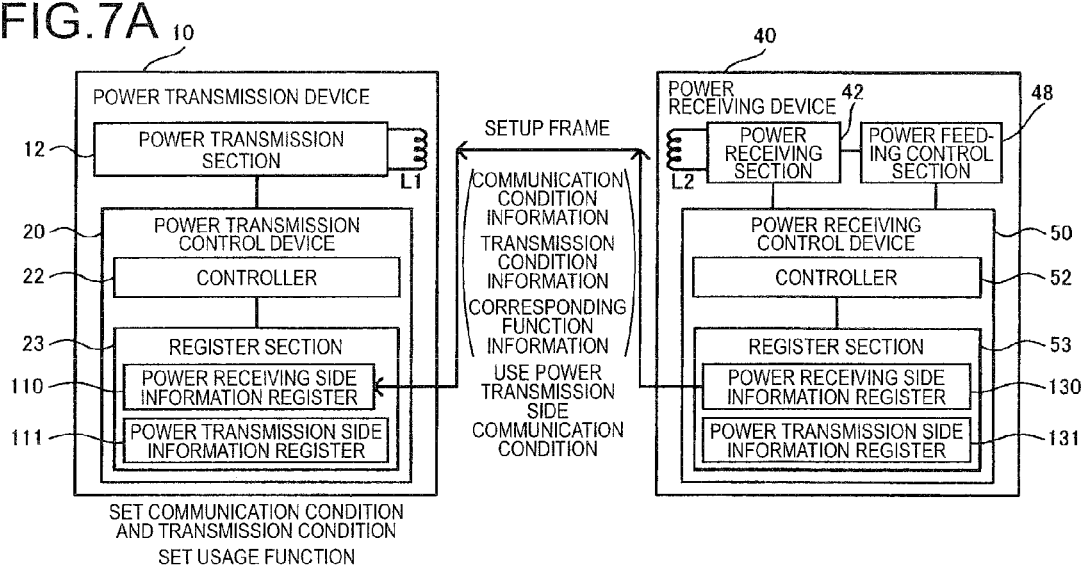
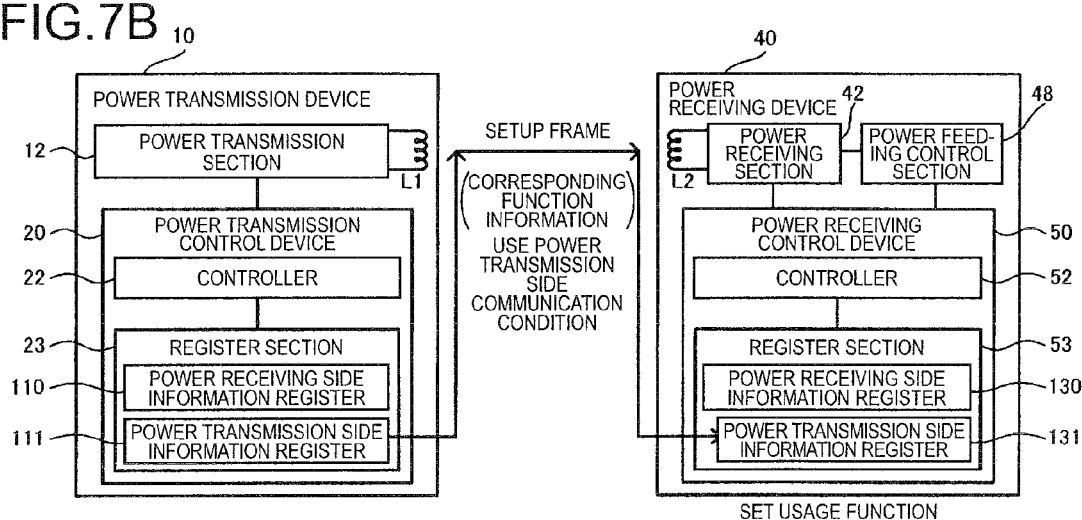
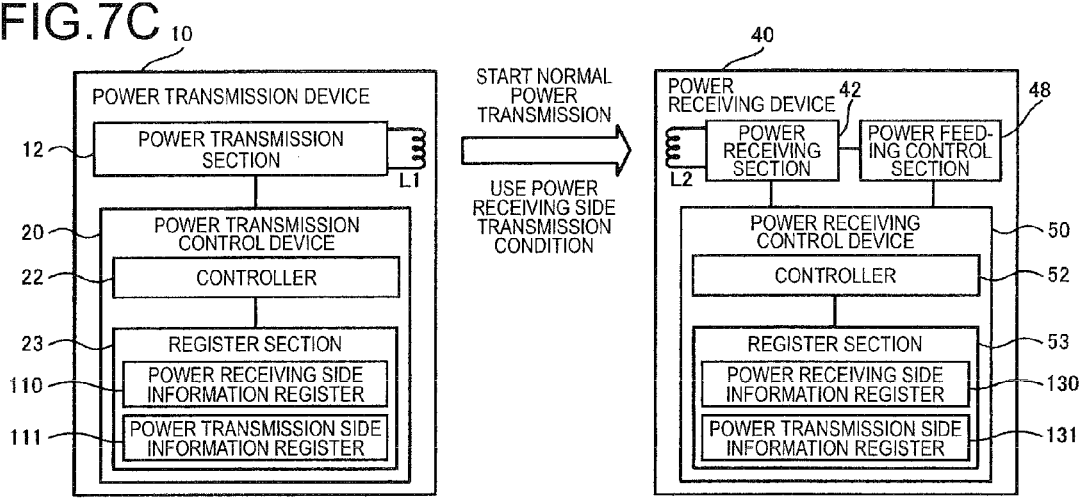

FIG. 11A

NEGOTIATION FRAME

| BEGINNING FIELD | INFORMATION FIELD | FINAL FIELD |
|---|---|---|
| | HARDWARE INFORMATION CODE | MATCHING CODE |

FIG. 11B

MATCHING CODE

| COMMAND ID | COIL CODE (CLASSIFICATION CODE, COIL ID) | EXTENSION CODE | STANDARD CODE |
|---|---|---|---|

FIG. 11C

HARDWARE INFORMATION CODE

| FOREIGN OBJECT THRESHOLD | SYSTEM CODE (SYSTEM INFORMATION) |
|---|---|

PRIMARY COIL             SECONDARY COIL
COIL XA
(CID = IDX)
COIL XB
(CID = IDX)
COIL X
(CID = IDX)
COIL XC
(CID = IDX)
COIL YA
(CID = IDY)
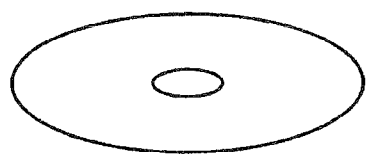
COIL YB
(CID = IDY)
COIL Y
(CID = IDY)
COIL YC
(CID = IDY)
FIG.13

POWER TRANSMISSION CONTROL DEVICE, POWER TRANSMISSION DEVICE, POWER RECEIVING CONTROL DEVICE, POWER RECEIVING DEVICE, AND ELECTRONIC APPARATUS

The present application claims a priority based on Japanese Patent Application No. 2008-185409 filed on Jul. 16, 2008, the contents of which are incorporated herein by reference.

BACKGROUND

1. Technical Field

The present invention relates to a power transmission control device, a power transmission device, a power receiving control device, a power receiving device, and an electronic apparatus.

2. Related Art

In recent years, contactless power transmission (non-contact power transmission) has been highlighted. The contactless power transmission makes it possible to perform transmission of electric power by utilizing electromagnetic induction without using a metallic contact. As an example of the contactless power transmission, charging cell phones and household equipment (e.g., cordless handsets of telephones) are suggested.

JP-A-2006-60909 is an example of related art of the contactless power transmission. In the example, an ID authentication is realized by transmitting and receiving an authentication code between a power transmission side (a primary side) and a power receiving side (a secondary side) so as to detect insertion of a foreign object or the like.

The related art disclosed in the example, however, is only on the assumption that a single power transmission device corresponds to a single power receiving device. The power transmission device determines only whether or not a device ID received from the power receiving device is appropriate. The related art is, thus, not on the assumption that the power transmission device needs to cope with various types of power receiving devices.

SUMMARY

An advantage of the invention is to provide a power transmission control device, a power transmission device, a power receiving control device, a power receiving device, and an electronic apparatus that have broad utility.

According to a first aspect of the invention, a power transmission control device provided in a power transmission device included in a contactless power transmission system that transmits power by electromagnetically coupling a primary coil and a secondary coil from the power transmission device to a power receiving device so as to supply the power to a load on the power receiving device. The power transmission control device includes a controller that controls the power transmission control device, and a register section. The register section includes a power receiving side information register that stores power receiving side information received from the power receiving device, and a power transmission side information register that stores power transmission side information. The controller performs at least one of: an authentication processing of the power receiving device; a power transmission control of the contactless power transmission; and a communication processing between the power transmission device and the power receiving device based on the power receiving side information stored in the power receiving side information register and the power transmission side information stored in the power transmission side register.

According to the invention, the power receiving side information received from the power receiving device is stored in the power receiving side information register while the power transmission side information is stored in the power transmission side information register. Based on the power receiving side information and the power transmission side information, at least one of the authentication processing, the power transmission control, and the communication processing is performed. This enables the power receiving side information and the power transmission side information to be stored and managed in the separate registers, so that storage management can be simplified. It allows processings of the controller to be simplified and the power transmission control device with high versatility to be provided.

In the invention, the power receiving side information register may include a power receiving side authentication information register that stores power receiving side authentication information received from the power receiving device. The power transmission side information register may include a power transmission side authentication information register that stores power transmission side authentication information. The controller may perform the authentication processing based on the power receiving side authentication information and the power transmission side authentication information.

Accordingly, the authentication processing can be realized only by collating the power receiving side authentication information in the power receiving side authentication information register and the power transmission side authentication information in the power transmission side authentication information register.

In the invention, the power receiving side authentication information register may store power receiving side coil information. The power transmission side authentication information register may store power transmission side coil information. The controller may perform the authentication processing based on the power receiving side coil information and the power transmission side coil information.

Accordingly, the authentication processing can be realized by collating the power receiving side coil information and the power transmission side coil information.

In the invention, the power receiving side information register may include a power receiving side transmission condition information register that stores power receiving side transmission condition information received from the power receiving device. The power transmission side information register may include a power transmission side transmission condition information register that stores power transmission side transmission condition information. Before a start of normal power transmission, the controller may perform the power transmission control based on the power transmission side transmission condition information stored in the power transmission side transmission condition information register while after the start of the normal power transmission, the controller may perform the power transmission control based on the power receiving side transmission condition information stored in the power receiving side transmission condition information register.

Accordingly, before the start of the normal power transmission, the power transmission can be controlled using the power transmission side transmission condition information while after the start of the normal power transmission, the power transmission can be controlled by using the power receiving side transmission condition information from the power receiving device. Therefore, the power transmission device can correspond to various kinds of power receiving devices, allowing versatility and the like to be improved.

In the invention, the controller may perform the power transmission control after the start of the normal power transmission based on the power receiving side transmission condition information that is received from the power receiving device and stored in the power receiving side transmission condition information register before the start of the normal power transmission.

Accordingly, since the power transmission control after the start of the normal power transmission can be realized based on the power receiving side transmission condition information received before the start of the normal power transmission, appropriate power transmission in accordance with the power receiving device can be realized.

In the invention, the power receiving side information register may include a power receiving side communication condition information register that stores power receiving side communication condition information received from the power receiving device. The power transmission side information register may include a power transmission side communication condition information register that stores power transmission side communication condition information. Before a start of normal power transmission, the controller may perform the communication processing based on the power transmission side communication condition information stored in the power transmission side communication condition information register while after the start of the normal power transmission, the controller may perform the communication processing based on the power receiving side communication condition information stored in the power receiving side communication condition information register.

Accordingly, it allows the communication processing to be performed by using the power transmission side communication condition information before the start of the normal power transmission while the communication processing to be performed by using the power receiving side communication condition information from the power receiving device after the start of the normal power transmission. Therefore, it is possible to communicate with an optimum communication condition in accordance with each period, a period before the start of the normal power transmission and a period after the start of the normal power transmission.

In the invention, the controller may perform the communication processing after the start of the normal power transmission based on the power receiving side communication condition information that is received from the power receiving device and stored in the power receiving side communication condition information register before the start of the normal power transmission.

Accordingly, since the communication processing after the start of the normal power transmission can be realized based on the power receiving side communication condition information received before the start of the normal power transmission, an improvement of communication quality and the like can be achieved In the invention, the power receiving side information register may include a power receiving side corresponding function information register that stores power receiving side corresponding function information received from the power receiving device. The power transmission side information register may include a power transmission side corresponding function information register that stores power transmission side corresponding function information. The controller may perform a setup processing of a usage function based on the power receiving side corresponding function information stored in the power receiving side corresponding function information register and the power transmission side corresponding function information stored in the power transmission side corresponding function information register.

Accordingly, a corresponding function can be determined only by collating the power receiving side corresponding function information and the power transmission side corresponding function information, so that the usage function can be set by simple a processing.

In the invention, in a test mode, the controller may perform the authentication processing, the power transmission control, and the communication processing by using the power transmission side information stored in the power transmission side information register without using the power receiving side information stored in the power receiving side information register.

Accordingly, in the test mode, the authentication processing, the power transmission control and the communication processing can be realized by setting the power transmission side information to various values without depending on the power receiving side information. This allows flexibility and efficiency of tests to be improved.

In the invention, the power transmission control device may further include a host interface that communicates with a power transmission side host. The power transmission side information register may include a plurality of registers. At least one of the plurality of the registers is set to be switchable between two states giving the power transmission side host a write-permission and a write-prohibition. The write is performed through the host interface.

Accordingly, important information in the power transmission side information registers can be prevented from being rewritten.

According to a second aspect of the invention, a power transmission device includes the power transmission control device according to the first aspect, and a power transmission section that generates an alternating voltage and supplies the voltage to the primary coil.

According to a third aspect of the invention, an electronic apparatus includes the power transmission device according to the second aspect.

According to a fourth aspect of the invention, a power receiving control device provided in a power receiving device included in a contactless power transmission system that transmits power by electromagnetically coupling a primary coil and a secondary coil from a power transmission device to the power receiving device so as to supply the power to a load on the power receiving device. The power receiving control device includes a controller that controls the power receiving control device, and a register section. The register section includes a power receiving side information register that stores power receiving side information, and a power transmission side information register that stores power transmission side information received from the power transmission device. The controller performs at least one of an authentication processing of the power transmission device and a communication processing between the power transmission device and the power receiving device based on the power receiving side information stored in the power receiving side information register and the power transmission side information stored in the power transmission side information register.

According to the invention, the power receiving side information is stored in the power receiving side information register while the power transmission side information received from the power transmission device is stored in the power transmission side information register. Based on the power receiving side information and the power transmission side information, at least one of the authentication processing and the communication processing is performed. This enables the power receiving side information and the power transmission side information to be stored and managed in the separate registers, so that storage management can be simplified. It allows processings of the controller to be simplified and the power receiving control device with high versatility to be provided.

In the invention, the power receiving side information register may include a power receiving side authentication information register that stores power receiving side authentication information. The power transmission side information register may include a power transmission side authentication information register that stores power transmission side authentication information received from the power transmission device. The controller may perform the authentication processing based on the power receiving side authentication information and the power transmission side authentication information.

Accordingly, the authentication processing can be realized only by collating the power receiving side authentication information in the power receiving side authentication information register and the power transmission side authentication information in the power transmission side authentication information register.

In the invention, the power receiving side authentication information register may store power receiving side coil information. The power transmission side authentication information register may store power transmission side coil information. The controller may perform the authentication processing based on the power receiving side coil information and the power transmission side coil information.

Accordingly, the authentication processing can be realized by collating the power receiving side coil information and the power transmission side coil information.

In the invention, the power receiving side information register may include a power receiving side corresponding function information register that stores power receiving side corresponding function information. The power transmission side information register may include a power transmission side corresponding function information register that stores power transmission side corresponding function information received from the power transmission device. The controller may perform a setup processing of a usage function based on the power receiving side corresponding function information stored in the power receiving side corresponding function information register and the power transmission side corresponding function information stored in the power transmission side corresponding function information register.

Accordingly, a corresponding function can be determined only by collating the power receiving side corresponding function information and the power transmission side corresponding function information, so that the usage function can be set by a simple processing.

According to a fifth aspect of the invention, a power receiving device includes the power receiving control device according to the fourth aspect, and a power receiving section that converts an induced voltage of the secondary coil into a direct current voltage.

According to a sixth aspect of the invention, an electronic apparatus includes the power receiving device according to the fifth aspect, and a load to which power is supplied by the power receiving device.

BRIEF DESCRIPTION OF THE DRAWINGS

The invention will be described with reference to the accompanying drawings, wherein like numbers reference like elements.

FIG. 4 is an example of a register map of a power receiving side information register and a power transmission side information register of the power transmission control device.

FIG. 5 is an example of a register map of a power receiving side information register and a power transmission side information register of the power receiving control device.

FIGS. 6A, 6B, and 6C are schematic views explaining an operation according to the embodiment.

FIGS. 7A, 7B, and 7C are schematic views explaining the operation according to the embodiment.

FIGS. 11A, 11B, and 11C are examples of a negotiation frame.

FIG. 13 is an explanatory diagram of coil information.

DESCRIPTION OF EXEMPLARY EMBODIMENTS

Embodiments of the invention will be described in detail below. The embodiments explained below do not unduly limit the contents of the invention described in the claims and all of the structures explained in the embodiments are not indispensable for the solving means of the invention.

1. Electronic Apparatus

Figure 1A:
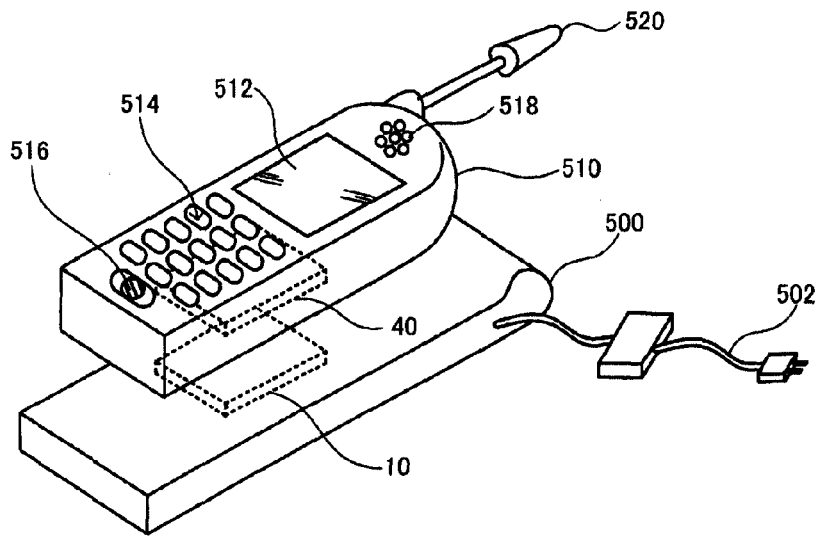
FIGS. 1A, 1B, and 1C are schematic views explaining contactless power transmission.

FIG. 1A shows an example of an electronic apparatus employing a contactless power transmission method according to an embodiment of the invention. A charger 500 (a cradle) that is one of electronic apparatuses includes a power transmission device 10. A cell phone 510 that is one of electronic apparatuses includes a power receiving device 40. The cell phone 510 includes a display 512 such as an LCD, an operation section 514 composed of buttons and the like, a microphone 516 (a voice input section), a speaker 518 (a voice output section), and an antenna 520.

Power is supplied to the charger 500 through an AC adapter 502, and the power is transmitted from the power transmission device 10 to the power receiving device 40 by contactless power transmission. Accordingly, a battery of the cell phone 510 can be charged and devices in the cell phone 510 can be operated.

The electronic apparatus according to the embodiment is not limited to the cell phone 510. The embodiment is applicable to various electronic apparatuses such as watches, cordless phones, shavers, electric toothbrushes, wrist computers, handy terminals, personal digital assistants, electric bicycles, and IC cards.

Figure 1B:
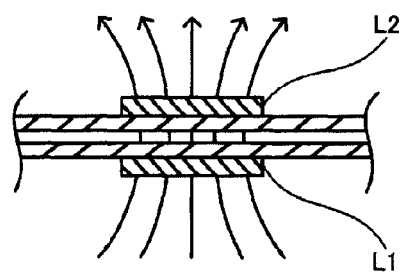

As schematically shown in FIG. 1B, power transmission from the power transmission device 10 to the power receiving device 40 is realized by electromagnetically coupling a primary coil L1 (a power transmission coil) used on the power transmission device 10 side and a secondary coil L2 (a power receiving coil) used on the power receiving device 40 side and thus forming a power transmission transformer. This realizes contactless power transmission.

In FIG. 1B, the primary coil L1 and the secondary coil L2 are, for example, a flat coil having an air-core formed by winding a coil wire in a spiral manner on a plane. The coil of the embodiment is not limited to this. Any coil can be employed regardless of its shape, structure, and the like as long as one can transmit power by electromagnetically coupling the primary coil L1 and the secondary coil L2.

Figure 1C:
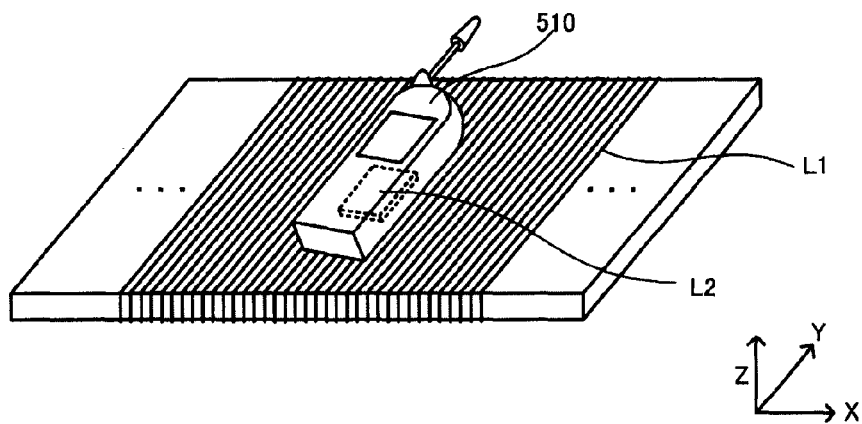

For example, in FIG. 1C, the primary coil L1 is formed by winding a coil wire in a spiral manner about an X axis with respect to a magnetic substance core. The secondary coil L2 provided in the cell phone 510 is similarly formed. The embodiment is also applicable to the coil shown in FIG. 1C. Further, in FIG. 1C, as the primary coil L1 and the secondary coil L2, in addition to the coil formed by winding a coil wire about the X axis, a coil formed by winding a coil wire about a Y axis may be combined.

2. Structure

Figure 2:
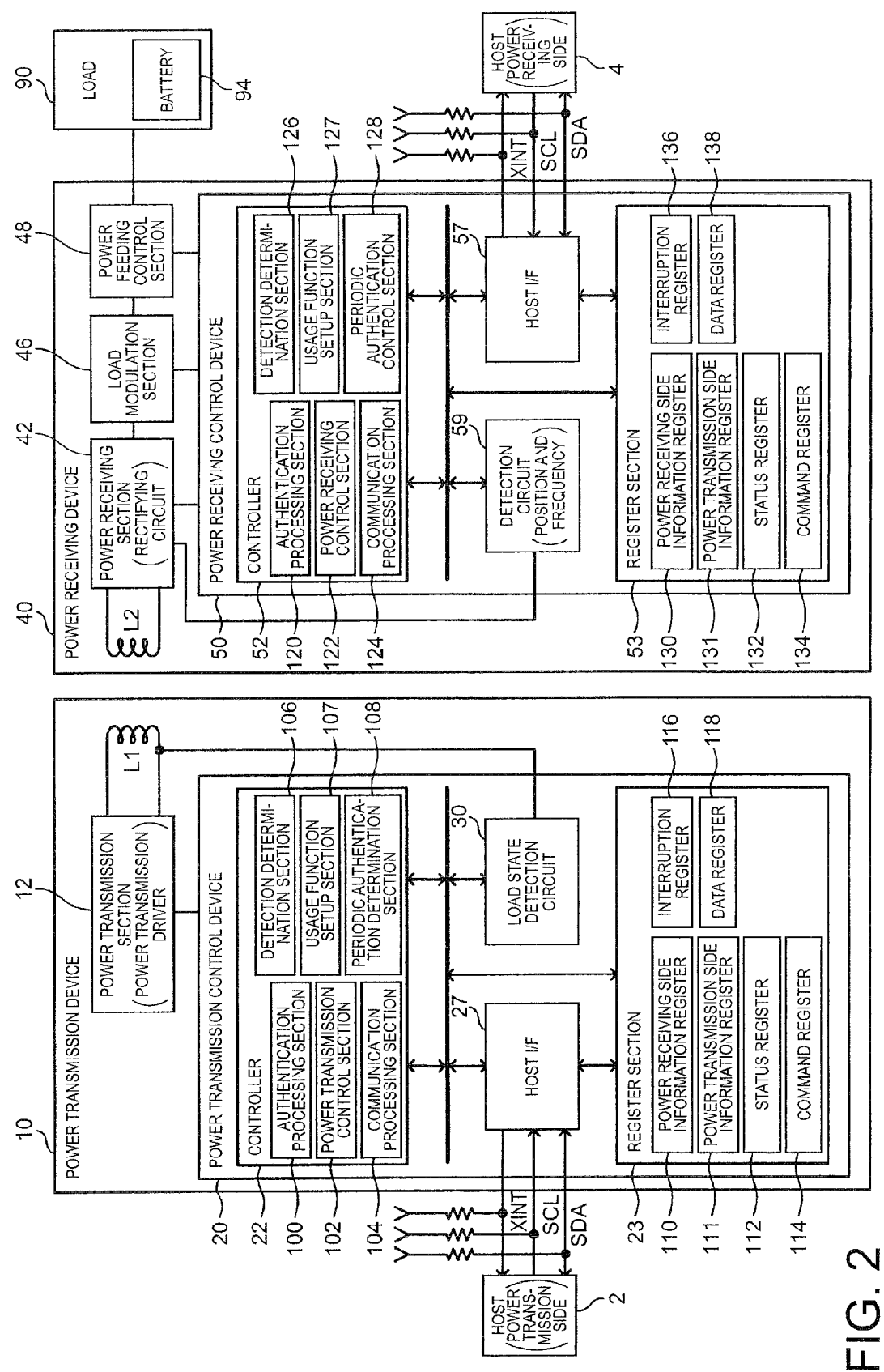
FIG. 2 is a structural example of a power transmission device, a power transmission control device, a power receiving device, and a power receiving control device according to an embodiment.

FIG. 2 shows a structural example of the power transmission device 10, a power transmission control device 20, the power receiving device 40, and a power receiving control device 50 according to the embodiment. The electronic apparatus, such as the charger 500 shown in FIG. 1A, used on a power transmission side includes the power transmission device 10 and a host 2 used on the power transmission side shown in FIG. 2. The electronic apparatus, such as the cell phone 510, used on a power receiving side may include the power receiving device 40, a load 90 (main load), and a host 4 used on the power receiving side. The hosts (host processors) 2 and 4 can be realized by, for example, a CPU, an application processor, an ASIC circuit, or the like, and perform various controls such as an overall control processing of the electronic apparatuses on the power transmission side and the power receiving side. Based on the structure shown in FIG. 2, a contactless power transmission (non-contact power transmission) system is realized in which the primary coil L1 and the secondary coil L2 are electromagnetically coupled so as to transmit power from the power transmission device 10 to the power receiving device 40 to supply the power to the load 90, for example.

The power transmission device 10 (a power transmission module, a primary module) may include the primary coil L1, a power transmission section 12, and the power transmission control device 20. The structures of the power transmission device 10 and the power transmission control device 20 are not limited to those shown in FIG. 2, and various modifications, such as omitting a part of components, adding another component (e.g., a waveform monitor circuit), and changing connections, can be made. For example, the power transmission section 12 may be included in the power transmission control device 20.

The primary coil L1 (the power transmission coil) and the secondary coil L2 (the power receiving coil) are electromagnetically coupled so as to form a power transmission transformer. For example, when the power transmission is required, as shown in FIGS. 1A and 1B, the cell phone 510 is placed on the charger 500 so that magnetic flux of the primary coil L1 passes through the secondary coil L2. On the other hand, when the power transmission is not required, the cell phone 510 is physically separated from the charger 500 so that the magnetic flux of the primary coil L1 does not pass through the secondary coil L2.

The power transmission section 12 generates an alternating current voltage having a predetermined frequency during the power transmission, and generates an alternating current voltage having a frequency varied in accordance with data during data transmission to supply each voltage to the primary coil L1. The power transmission section 12 may include a first power transmission driver for driving one end of the primary coil L1, a second power transmission driver for driving the other end of the primary coil L1, and at least one capacitor forming a resonance circuit together with the primary coil L1. Each of the first and the second power transmission drivers included in the power transmission section 12 is an inverter circuit (a buffer circuit) composed of, for example, a power MOS transistor, and is controlled by the power transmission control device 20.

In FIG. 2, data communication from the power transmission side to the power receiving side is realized by a frequency modulation while data communication from the power receiving side to the power transmission side is realized by a load modulation.

Figure 3A:
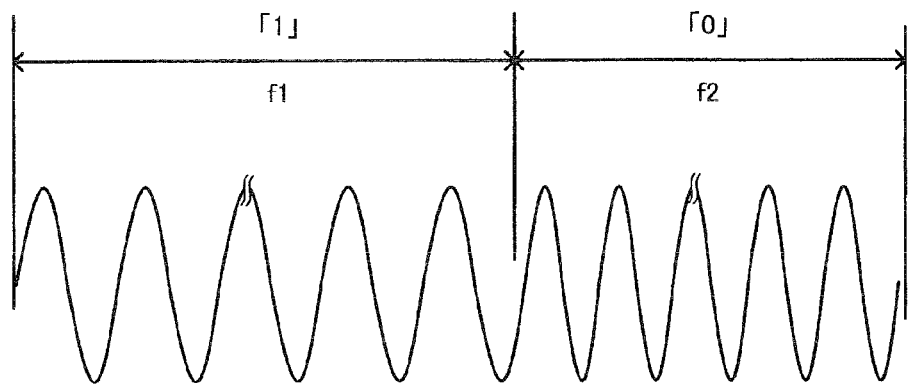
FIGS. 3A and 3B are explanatory views of data transmission by a frequency modulation and a load modulation.

Specifically, as shown in FIG. 3A, for example, when data "1" is transmitted to the power receiving side, the power transmission section 12 generates an alternating current voltage of a frequency f1. On the other hand, when data "0" is transmitted, the power transmission section 12 generates an alternating current voltage of a frequency f2. Then, a detection circuit 59, on the power receiving side, detects the frequency change so as to determine data "1" or "0." As a result, data communication by the frequency modulation from the power transmission side to the power receiving side can be realized.

Figure 3B:
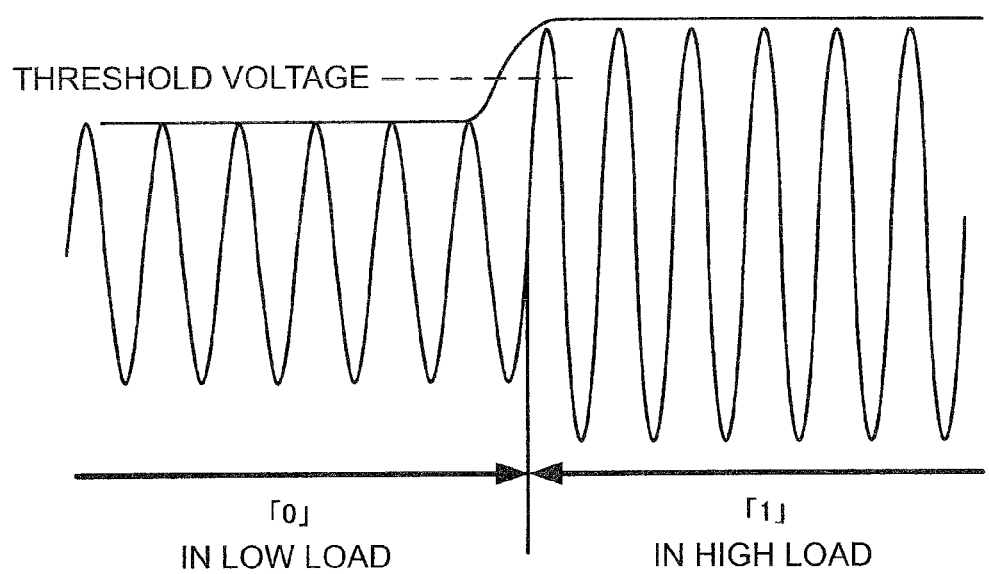

On the other hand, in a load modulation section 46, on the power receiving side, a load on the power receiving side is varied in accordance with data to be transmitted. That is, as shown in FIG. 3B, a signal waveform of an induced voltage of the primary coil L1 is changed. For example, when data "1" is transmitted to the power transmission side, the power receiving side is in a high load state. On the other hand, when data "0" is transmitted, the power receiving side is in a low load state. Then, a load state detection circuit 30, on the power transmission side, detects the load state change on the power receiving side so as to determine data "1" or "0." As a result, data communication by the load modulation from the power receiving side to the power transmission side can be realized.

In FIGS. 3A and 3B, data communication from the power transmission side to the power receiving side is realized by the frequency modulation while data communication from the power receiving side to the power transmission side is realized by the load modulation. However, another modulation method or other methods may be employed.

The power transmission control device 20 performs various controls of the power transmission device 10, and can be realized by an integrated circuit (IC) device, a computer with a program operating on the micro computer, or the like. The power transmission control device 20 may include a controller 22, a register section 23, a host I/F (an interface) 27, and the load state detection circuit 30. In this regard, modifications, such as omitting a part of the components (e.g., the host I/F, the load state detection circuit) and adding another component, can be made.

The controller 22 (on the power transmission side) performs controls of the power transmission control device 20 and the power transmission device 10. The controller 22 can be realized by an ASIC circuit such as a gate array, a micro computer with a program operating on the micro computer, or the like. The controller 22 performs controls of power transmission using the power transmission section 12 as well as controlling the register section 23 and the load state detection circuit 30.

The controller 22 includes an authentication processing section 100, a power transmission control section 102, a communication processing section 104, a detection determination section 106, a usage function setup section 107, and a periodic authentication determination section 108.

The authentication processing section 100 performs an authentication processing. For example, a collation processing is performed in which power receiving side authentication information (e.g., standard/coil/system information on the power receiving side) is collated with power transmission side authentication information (e.g., standard/coil/system information on the power transmission side) by a negotiation processing and the like described below so as to authenticate whether or not the power receiving device 40 is an appropriate device. The power transmission control section 102 performs a power transmission control. For example, a sequence control and a power control for power transmission (normal power transmission, temporary power transmission) of contactless power transmission are performed. The communication processing section 104 performs a communication processing between the power transmission device 10 and the power receiving device 40. For example, a data transmission processing to the power receiving side by the frequency modulation and the like and a data receiving processing from the power receiving side by a load demodulation and the like are controlled. For example, when the load state detection circuit 30 performs detection of a load state of the power receiving device, the detection determination section 106, based on the detection information, performs detection determination such as foreign object detection and removal detection. The usage function setup section 107 performs a setup processing of a function to use (a communication function, a periodic authentication function, and the like). For example, based on power receiving side corresponding function information received from the power receiving side and power transmission side corresponding function information, a determination processing of corresponding function is performed so as to set (determine) a usage function. When the power receiving side performs periodic authentication after starting normal power transmission, the periodic authentication determination section 108 performs a determination processing that determines whether or not appropriate periodic authentication is performed.

The register section 23 (a storing section) can be accessed (written, read) by the host 2, on the power transmission side, through the host I/F 27, and can be realized by an RAM, a D flip-flop, or the like, for example. The register section 23 includes a power receiving side information register 110 (a power receiving side parameter register), a power transmission side information register 111 (a power transmission side parameter register), a status register 112, a command register 114, an interruption register 116, and a data register 118. The information to be stored in the register section 23 may be stored in a nonvolatile memory such as a flash memory and a mask ROM.

The power receiving side information register (a secondary side information register) 110 stores power receiving side information (a power receiving side parameter). For example, power receiving side information received from the power receiving device 40 is stored. The power receiving side information includes authentication information (coil information), transmission condition information (a driving voltage, a driving frequency), communication condition information (a communication method, a communication parameter), abnormality detection information (an abnormality detection threshold), corresponding function information, and the like on the power receiving side. The power receiving side information is, for example, received from the power receiving device 40 before the start of normal power transmission (during the negotiation processing or a setup processing), and is stored in the power receiving side information register 110.

The power transmission side information register (a primary side information register) 111 stores power transmission side information (a power transmission side parameter). For example, the power transmission information serving as a default value (an initial value) of the power transmission side (the power transmission control device) is stored. The power transmission side information includes authentication information, transmission condition information, communication condition information, abnormality detection information, corresponding function information, and the like on the power transmission side. Some of the power transmission side information is transmitted to the power receiving device 40, for example, before the start of normal power transmission (during the negotiation processing and the setup processing).

The status register 112 is used for confirming various states, such as a power transmission state and a communication state, by the host 2. The command register 114 is used for writing various commands by the host 2. The interruption register 116 is used for various interruptions, and includes a register for setting enable/disable of the various interruptions and a register for notifying the host 2 of a factor of the interruption, for example. The data register 118 is used for buffering transmitted data for a charge side and received data from the power receiving side.

The host I/F 27 is an interface for communicating with the host 2, on the power transmission side, and the communication can be realized by an inter integrated circuit (I2C) in FIG. 2. The host 2 is a CPU or the like included in the electronic apparatus (a charger) on the power transmission device.

The I2C is a communication method for communicating data between a plurality of devices provided closely on a same substrate and the like. The communication is performed by sharing two signal lines, a serial data (SDA) line and a serial clock (SCL) line, as a bus between the plurality of the devices. Specifically, the communication is realized in that one device is designated as a master (host) out of the devices and coupled to other devices serving as a slave through the bus. The slave side can interrupt the master using a XINT (external interrupt). The slave side can also request an interruption through the I2C bus. The communication method between the host and the host I/F is not limited to the I2C, and communication methods based on similar ideas to the I2C, and communication methods for a normal serial interface and a parallel interface may be employed.

The load state detection circuit 30 (a waveform detection circuit) detects a load state of the power receiving side (the power receiving device or foreign objects). The load state detection can be realized by detecting variations in the waveform of an induced voltage signal (a coil terminal signal) of the primary coil L1. For example, a variation of a load state (a load current) of the power receiving side (the secondary side) induces a variation in the waveform of the induced voltage signal. The load state detection circuit 30 detects the variation of the waveform, and outputs a detection result (detection result information) to the controller 22. Then, the controller 22, based on the detection information of the load state of the load state detection circuit 30, determines a load state (load fluctuation, a degree of the load) of the power receiving side (the secondary side).

The power receiving device 40 (a power receiving module, a secondary module) may include the secondary coil L2, a power receiving section 42, the load modulation section 46, a power feeding control section 48, and the power receiving control device 50. The structures of the power receiving device 40 and the power receiving control device 50 are not limited to those shown in FIG. 2, and various modifications, such as omitting a part of components (e.g., the load modulation section), adding another component, and changing connections, can be made. For example, any of the power receiving section 42, the load modulation section 46, and the power feeding control section 48 may be included in the power receiving control device 50.

The power receiving section 42 converts an alternating induced voltage of the secondary coil L2 into a direct current voltage. The conversion can be realized by a rectifying circuit and the like included in the power receiving section 42.

The load modulation section 46 performs a load modulation processing. Specifically, when data is transmitted from the power receiving side to the power transmission side, a load on the load modulation section 46 (on the secondary side) is varied in accordance with data to be transmitted so as to vary a signal waveform of the induced voltage of the primary coil L1 as shown in FIG. 3B.

The power feeding control section 48 controls power feeding to the load 90. That is, the power feeding control section 48 controls turning on/off the power feeding to the load 90. Specifically, a level of the direct current voltage from the power receiving section 42 (a rectifying circuit) is regulated so as to generate a power supply voltage. Thereafter, the power supply voltage is supplied to the load 90 so as to charge a battery 94 of the load 90. The load 90 may not include the battery 94.

The power receiving control device 50 performs various controls of the power receiving device 40, and can be realized by an integrated circuit (IC) device, a computer with a program operating on the micro computer, or the like. The power receiving control device 50 operates with a power supply voltage generated from the induced voltage of the secondary coil L2. The power receiving control device 50 may include a controller 52, a register section 53, a host I/F 57, and the detection circuit 59. In this regard, modifications, such as omitting a part of the components (e.g., the host I/F, the detection circuit) and adding another component, can be made.

The controller 52 (on the power receiving side) performs a control of the power receiving control device 50 and the power receiving device 40. The controller 52 can be realized by an ASIC circuit such as a gate array, a micro computer with a program operating on the micro computer, or the like. The controller 52 performs a control of the load modulation section 46, the power feeding control section 48, and the register section 53.

The controller 52 includes an authentication processing section 120, a power receiving control section 122, a communication processing section 124, a detection determination section 126, a usage function setup section 127, and a periodic authentication control section 128.

The authentication processing section 120 performs an authentication processing. For example, a collation processing is performed in which power receiving side authentication information is collated with power transmission side authentication information by the negotiation processing and the like so as to authenticate whether or not the power transmission device 10 is an appropriate device. The power receiving control section 122 performs a power receiving control. For example, a sequence control for power receiving of contactless power transmission is performed. The communication processing section 124, for example, performs a control of a data transmission processing to the power transmission side by the frequency modulation and a data receiving processing from the power transmission side by the load demodulation. When the detection circuit 59 performs position detection or frequency detection, the detection determination section 126 performs detection determination based on the detection information. The usage function setup section 127 sets a usage function based on power transmission side corresponding function information received from the power transmission side and power receiving side corresponding function information. The periodic authentication control section 128 performs a control of periodic authentication performed after the start of normal power transmission. For example, in order to detect a so-called takeover state by a foreign object, a load state of the power receiving side is periodically (intermittently) varied after the start of normal power transmission.

The register section 53 (a storing section) can be accessed by the host 4, on the power receiving side, through the host I/F 57, and can be realized by an RAM, a D flip-flop, or the like, for example. The register section 53 includes a power receiving side information register 130, a power transmission side information register 131, a status register 132, a command register 134, an interruption register 136, and a data register 138. The information to be stored in the register section 53 may be stored in a nonvolatile memory such as a flash memory and a mask ROM.

The power receiving side information register 130 stores power receiving side information. For example, power receiving side information serving as a default value (an initial value) of the power receiving side (the power receiving control device) is stored. The power receiving side information is transmitted to the power transmission device 10 before the start of normal power transmission, for example.

The power transmission side information register 131 stores power transmission side information. The power receiving side information is, example, received from the power transmission device 10 and stored in the power transmission side information register 131 before the start of normal power transmission.

Since functions of the status register 132, the command register 134, the interruption register 136, the data register 138 are almost the same as the registers on the power transmission side, description thereof will be omitted.

The host I/F 57 is, for example, an interface to communicate with the host 4, on the power receiving side, by the I2C or the like. The host 4 is a CPU, an application processor, or the like included in the electronic apparatus on the power receiving device. The detection circuit 59 performs detection of a positional relation between the primary coil L1 and the secondary coil L2 as well as a coil driving frequency during data transmission from the power transmission side to the power receiving side.

In FIG. 2, the register section 23, on the power transmission side, includes the power receiving side information register (a register group) 110 and the power transmission side information register (a register group) 111. That is, an information register is separated (segmented) into two information registers having different address ranges, the power receiving side information register (a power receiving side register segment) 110 and the power transmission side information register (a power transmission side register segment) 111.

Then, based on the power receiving side information stored in the power receiving side information register 110 and the power transmission side information stored in the power transmission side information register 111, the controller 22, on the power transmission side, performs at least one of an authentication processing of the power receiving device 40; a power transmission control of contactless power transmission; and a communication processing between the power transmission device 10 and the power receiving device 40. That is, with either or both of the power receiving side information and the power transmission side information, the authentication processing, the power transmission control, or the communication processing is performed.

This enables the power receiving side information and the power transmission side information to be stored and managed in the separate registers, so that storage management can be simplified. Further, for example, in accordance with each period, such as a period before the start of normal power transmission and a period after the start of normal power transmission, the authentication processing, the power transmission control, or the communication processing can be realized with either or both of the power receiving side information and the power transmission side information. This makes it possible to simplify processing of the controller 22 and reduce processing loads.

For example, the power receiving side information register 110 includes a power receiving side authentication information register that stores power receiving side authentication information received from the power receiving device 40 while the power transmission side information register 111 may include a power transmission side authentication information register that stores power transmission side authentication information. In this case, the controller 22 performs the authentication processing based on the power receiving side authentication information (power receiving side coil information) and the power transmission side authentication information (power transmission side coil information). For example, the collation processing of the power receiving side authentication information and the power transmission side authentication information (a confirmation processing whether or not they are matched) is performed.

Accordingly, the controller 22 allows the authentication processing to be realized only by collating the power receiving side authentication information and the power transmission side authentication information. This makes it possible to simplify the authentication processing and reduce processing loads.

The power receiving side information register 110 includes a power receiving side transmission condition information register that stores power receiving side transmission condition information received from the power receiving device 40 while the power transmission side information register 111 may include a power transmission side transmission condition information register that stores power transmission side transmission condition information. In this case, the controller 22 performs the power transmission control based on the power transmission side transmission condition information before the start of normal power transmission. On the other hand, the controller 22 performs the power transmission control based on the power receiving side transmission condition information (e.g., the power receiving side transmission condition information received and stored before the start of normal power transmission). For example, before the start of normal power transmission, by a use of a driving voltage (VF0) and a driving frequency (f01) that are the power transmission side transmission condition information set as a default value (an initial value), the power transmission control (a power control) of contactless power transmission is performed. On the other hand, after the start of normal power transmission, for example, by a use of a driving voltage (VF) and a driving frequency (f1) that are the power receiving side transmission condition information received from the power receiving device 40 before the start of normal power transmission, the power transmission control of contactless power transmission is performed.

Accordingly, before the start of normal power transmission, the power transmission can be controlled using the power transmission side transmission condition information stored in the power transmission side as a default value. On the other hand, after the start of normal power transmission, the power transmission can be controlled using the power receiving side transmission condition information from the power receiving device 40. Therefore, the power transmission can be performed at low power (e.g., 0.5 watts) in a case where the power receiving side only corresponds to the low power while the power transmission can be performed at high power (e.g., 5 to 15 watts) in a case where the power receiving side corresponds to the high power. As a result, a multi-power adaptive system can be realized that can correspond to a plurality kinds of power receiving devices having different power specifications. For example, setting the power transmission side transmission condition information before the start of normal power transmission to the low power (weak power) allows EMI noise to be reduced during information communication in a temporary power transmission period before the start of normal power transmission.

The power receiving side information register 110 includes a power receiving side communication condition information register that stores power receiving side communication condition information received from the power receiving device 40 while the power transmission side information register 111 may include a power transmission side communication condition information register that stores power transmission side communication condition information. In this case, the controller 22 performs the communication processing based on the power transmission side communication condition information before the start of normal power transmission. On the other hand, the controller 22 performs the communication processing based on the power receiving side communication condition information after the start of normal power transmission. For example, before the start of normal power transmission, by a use of the communication method and a communication parameter (f02, SIGH) that are the power transmission side communication condition information set as a default value (an initial value), an information transmission processing to the power receiving side (data transmission such as the frequency modulation) and an information receiving processing from the power receiving side (data detection such as the load demodulation) are performed. On the other hand, after the start of normal power transmission, for example, by a use of the communication method (method) and a communication parameter (f2, SIGH2) that are the power receiving side communication condition information received from the power receiving device 40 before the start of normal power transmission, the information transmission processing to the power receiving side and the information receiving processing from the power receiving side are performed.

Accordingly, before the start of normal power transmission, the communication can be performed using the power transmission side communication condition information stored as a default value in the power transmission side. On the other hand, after the start of normal power transmission, the communication can be performed using the power receiving side communication condition information from the power receiving device 40. Therefore, communication can be performed with an optimum communication condition in accordance with each period, the period before the start of normal power transmission and the period after the start of normal power transmission. As a result, quality of communication can be improved. For example, before the start of normal power transmission, the information (negotiation/set up information) communication is performed while the temporary power transmission is performed at the low power. On the other hand, after the start of normal power transmission, the information (application data) communication is performed while the power transmission is performed at power corresponds to the plurality kinds of the power receiving devices having different power specifications. In this case, setting different communication conditions between the temporary power transmission period before the start of normal power transmission and the normal power transmission period allows communication errors and EMI noises to be reduced. As a result, quality of communication can be improved.

The power receiving side information register 110 includes a power receiving side corresponding function information register that stores power receiving side corresponding function information received from the power receiving device 40 while the power transmission side information register 111 may include a power transmission side corresponding function information register that stores power transmission side corresponding function information. In this case, the controller 22 performs a setup processing of the usage function (a communication function, a periodic authentication function, and the like) based on the power receiving side corresponding function information and the power transmission side corresponding function information. For example, based on the power receiving side corresponding function information and the power transmission side corresponding function information, a function corresponds to both the power receiving side and the power transmission side is determined so as to set the function corresponds to both of them as a function to use.

Accordingly, the controller 22 can determine the corresponding function only by collating the power receiving side corresponding function information and the power transmission side corresponding function information. This makes it possible to setup the usage function by a simple processing.

In FIG. 2, the register section 53, on the power receiving side, includes the power receiving side information register 130 and the power transmission side information register 131. Then, based on the power receiving side information stored in the power receiving side information register 130 and the power transmission side information stored in the power transmission side information register 131, the controller 52, on the power receiving side, performs at least one of the authentication processing; the power receiving control; and the communication processing. This enables storage management to be simplified as well as the processing of the controller 52 to be simplified and processing loads to be reduced.

For example, the power receiving side information register 130 includes the power receiving side authentication information register that stores power receiving side authentication information while the power transmission side information register 131 may include the power transmission side authentication information register that stores power transmission side authentication information received from the power transmission device 10. In this case, the controller 52 performs the authentication processing based on the power receiving side authentication information (power receiving side coil information) and the power transmission side authentication information (power transmission side coil information). Accordingly, the controller 52 allows the authentication processing to be realized only by collating the power receiving side authentication information and the power transmission side authentication information. This enables the authentication processing to be simplified and processing loads to be reduced.

The power receiving side information register 130 includes the power receiving side corresponding function information register that stores power receiving side corresponding function information while the power transmission side information register 131 may include the power transmission side corresponding function information register that stores power transmission side corresponding function information received from the power transmission device 10. In this case, the controller 52 performs the setup processing of the usage function based on the power receiving side corresponding function information and the power transmission side corresponding function information. Accordingly, the corresponding function can be determined only by collating the power receiving side corresponding function information and the power transmission side corresponding function information, so that the usage function can be set by a simple processing.

In FIG. 2, the hosts I/F 27 and 25 are provided on the power transmission side and the power receiving side, so that communication can be performed between the host 2 on the power transmission side and the host 4 on the power receiving side. That is, in a related art contactless power transmission system, only ID authentication information can be communicated between the power transmission side and the power receiving side. Whereas, according to the structure shown in FIG. 2, for example, application data can be communicated between an apparatus used on the power transmission side, such as a charger, and an apparatus used on the power receiving side, such as a cell phone, by utilizing contactless power transmission. Accordingly, data communication can be performed between the apparatuses by utilizing a charge period and the like. As a result, convenience of users can be significantly increased.

Specifically, as shown in FIG. 2, a communication request command is written in the register section 23 by the host 2 through the host I/F 27. The communication request command requests communication between the host 2, on the power transmission side, and the host 4, on the power receiving side. In this case, the controller 22, on the power transmission side, moves to a communication mode, and transmits the communication request command to the power receiving device 40. In the communication mode, communication between the hosts 2 and 4 is performed.

On the other hand, the controller 52, on the power receiving side, moves to the communication mode after receiving the communication request command that requests communication between the hosts 2 and 4 from the power transmission device 10. For example, if the communication request command is transmitted from the power transmission side, the reception of the command is notified to the host 4, and an operation mode of the power receiving side also moves to the communication mode. This allows communicate between the hosts 2 and 4 to be performed.

The communication request command includes, for example, an OUT transfer command and an IN transfer command. The OUT transfer command requests data transfer from the host 2, on the power transmission side, to the host 4, on the power receiving side. When the OUT transfer command is written in the command register 114 of the register section 23, the controller 22 transmits the OUT transfer command to the power receiving device 40. Next, after a confirmation of an ACK command returned from the power receiving side, a data transfer command (DATA0, DATA1) instructing data transfer is written in the command register 114. Then, when corresponding data is written in the data register 118, the data transfer command and the data are transmitted to the power receiving device 40.

On the other hand, the IN transfer command requests data transfer from the host 4, on the power receiving side, to the host 2, on the power transmission side. When the IN transfer command is written in the command register 114, the controller 22 transmits the IN transfer command to the power receiving device 40. Next, when a data transfer command and data are received from the power receiving device 40, the received data is written in the data register 118. Further, the reception of the data transfer command is notified to the host 2 by the interruption register 116.

When the controller 22 moves to the communication mode, then controller 22 switches at least either one of the transmission condition and the communication condition of contactless power transmission to a communication mode condition that is different from a normal power transmission condition. Specifically, when the normal power transmission is started, contactless power transmission is performed with the normal power transmission condition. Then, after the start of the normal power transmission, the communication request command (IN, OUT) is issued by the host 2, and the controller 22 moves to the communication mode from the normal power transmission mode (a charge mode). Thereafter, the controller 22 switches the communication condition and the transmission condition for the normal power transmission to the communication condition and the transmission condition for the communication mode.

The communication condition and the transmission condition for the communication mode may include conditions for communication and transmission in the temporary power transmission period before the start of normal power transmission. That is, commands (a communication interruption request command, a full charge detection command, a recharge confirmation command, and the like) are communicated in the normal power transmission period. Therefore, the commands are required to be communicated using the power receiving side communication condition and the transmission condition information received from the power receiving device 40. On the other hand, in the communication mode that allows communication of application data, power supply to the load 90 can be stopped. Accordingly, it is not required to use the power receiving side communication condition and the transmission condition, so that the power transmission side communication condition and the transmission condition information are used. The power transmission side communication condition and the transmission condition information are set to default so as to achieve safer and more reliable communication. That is, in the communication mode, the communication condition and the transmission condition used in the temporary power transmission period are used, which are set so as to prioritize communication reliability rather than power transmission efficiency. For example, the driving frequency and the driving voltage are set to a lower level. Accordingly, data transfer errors and the like can be reduced, whereby improving the reliability of the communication.

In a case where a communication interruption request command issued by the host 4 on the power receiving side is received, the controller 22 also moves to the communication mode. Specifically, when the host 4 issues the communication interruption request command (INT), the reception of the command is notified to the host 2 by the interruption register 116 and the controller 22 moves to the communication mode. Accordingly, the controller 22 can move to the communication mode not only by the communication request from the host 2 on the power transmission side, but also by the communication request from the host 4 on the power receiving side. The register section 53 on the power receiving side also includes the command register 134 in which the command issued by the host 4, on the power receiving side, is written. When the communication interruption request command (INT) to the host 2, on the power transmission side, is written in the command register 134 by the host 4, on the power receiving side, the controller 52, on the power receiving side, moves to the communication mode.

3. Power Receiving Side Information Register and Power Transmission Side Information Register FIG. 4 shows an example of a register map of the power receiving side information register 110 and the power transmission side information register 111 included in the register section 23, on the power transmission side. In FIG. 4, the power receiving side information register 110 is assigned to a first address range (e.g., 0x00 to 0x12) while the power transmission side information register 111 is assigned to a second address range (e.g., 0x13 to 0x24).

The power receiving side authentication information register of the power receiving side information register 110 stores standard/coil/system information and first foreign object threshold information (META) as power receiving side authentication information. The information received from the power receiving device 40 in the negotiation processing described below and stored in the register.

The power receiving side transmission condition information register of the power receiving side information register 110 stores information on the driving voltage (VF) and the driving frequency (f1) as power receiving side transmission condition information. The power receiving side communication condition information register stores information on the communication method (method) and a communication parameter (f2, SIGH2, LEVL, and LEVH) as power receiving side communication condition information. The power receiving side abnormality detection information register stores an abnormality detection threshold (METUP and LEAVE) for performing such as overload detection and removal detection, as power receiving side abnormality detection information. The power receiving side corresponding function information register stores information on the function (a communication function, a periodic authentication function, and the like) that can correspond to the power receiving side. The information above is received from the power receiving device 40 in the setup processing described below and stored in the registers.

The power transmission side authentication information register of the power transmission side information register 111 stores standard/coil/system information and first foreign object threshold information (META0) as power transmission side authentication information. The standard/coil/system information is transmitted to the power receiving device 40 in the negotiation processing.

The power transmission side transmission condition information register of the power transmission side information register 111 stores information on the driving voltage (VF0) and the driving frequency (f01) as power transmission side transmission condition information. The power transmission side communication condition information register stores information on the communication parameter (f02, SIGH) as power transmission side communication condition information. The power transmission side abnormality detection information register stores an abnormality detection threshold (METUP0, LEAVE0) for performing such as overload detection and removal detection. The information above serves as default information initially set on the power transmission side.

The power transmission side corresponding function information register stores information on a function that can correspond to the power transmission side. The information is transmitted to the power receiving device 40 in the setup processing.

FIG. 5 shows an example of a register map of the power receiving side information register 130 and the power transmission side information register 131 included in the register section 53, on the power receiving side. In FIG. 5, the power receiving side information register 130 is assigned to a third address range (e.g., 0x00 to 0x12) while the power transmission side information register 131 is assigned to a fourth address range (e.g., 0x13 to 0x1A).

The power receiving side authentication information stored in the power receiving side authentication information register of the power receiving side information register 130 is transmitted to the power transmission device 10 in the negotiation processing. On the other hand, the power receiving side transmission condition/communication condition/abnormality detection/corresponding function information stored in the power receiving side transmission condition/communication condition/abnormality detection/corresponding function information registers is transmitted to the power transmission device 10 in the setup processing.

The power transmission side authentication information stored in the power transmission side authentication information register of the power transmission side information register 131 is received from the power transmission device 10 and is stored in the register in the negotiation processing. On the other hand, the power transmission side corresponding function information stored in the power transmission side corresponding function information register is received from the power transmission device 10 and stored in the register in the setup processing.

4. Operation

Next, operations of the embodiment will be described with reference to FIGS. 6A to 8C.

As shown in FIG. 6A, first, the power transmission device 10 starts temporary power transmission (power transmission for detecting a position) before the start of normal power transmission. With this temporary power transmission, a power supply voltage is supplied to the power receiving device 40, so that the power receiving device 40 is turned on. The temporary power transmission is performed using the driving voltage (VF0) and the driving frequency (f01) of the power transmission side transmission condition information set in the power transmission side information register 111. The power receiving device 40, for example, determines whether or not a positional relation between the primary coil L1 and the secondary coil L2 is appropriate.

As shown in FIG. 6B, if the positional relation between the L1 and the L2 is determined to be appropriate, the power receiving device 40 makes a negotiation frame so as to transmit it to the power transmission device 10. Specifically, the power receiving side authentication information, such as the standard/coil/system information and the first foreign object threshold information, is read from the power receiving side information register 130. Then the negotiation frame is made and transmitted to the power transmission device 10. The communication of the negotiation frame in this case is performed by the communication parameter (f02, SIGH) of the power transmission side communication condition information set in the power transmission side information register 111.

When the power transmission device 10 receives the negotiation frame from the power receiving device 40, the power receiving side authentication information of the negotiation frame is written and stored in the power receiving side information register 110. Then, the authentication processing is performed based on the power receiving side authentication information and the power transmission side authentication information stored in the power transmission side information register 111. Specifically, the standard/coil/system information on the power receiving side authentication information is collated with the standard/coil/system information on the power transmission side authentication information so as to determine whether or not the power receiving device 40 is an appropriate device. Further, based on the first foreign object threshold information received from the power receiving device 40, first foreign object detection before the start of normal power transmission is performed so as to determine whether or not a load state of the power receiving side is appropriate.

When is it determined that the power receiving side authentication information is compatible (matched) with the power transmission side authentication information and no foreign object is detected, as shown in FIG. 6C, the power transmission device 10 makes a negotiation frame based on the power transmission side authentication information in the power transmission side information register 111 so as to transmit it to the power receiving device 40. The communication of the negotiation frame in this case is performed using the communication parameter of the power transmission side communication condition information.

When the power receiving device 40 receives the negotiation frame from the power transmission device 10, the power transmission side authentication information of the negotiation frame is written and stored in the power transmission side information register 131. Then, the authentication processing is performed based on the power transmission authentication information and the power receiving side authentication information stored in the power receiving side information register 130 so as to determine whether or not the power transmission device 10 is an appropriate device.

When is it determined the power receiving side authentication information is compatible with the power transmission side authentication information, as shown in FIG. 7A, based on the power receiving side communication condition/transmission condition/corresponding function information in the power receiving side information register 130, the power receiving device 40 makes a setup frame so as to transmit it to the power transmission device 10. The communication of the setup frame in this case is performed using the power transmission side communication condition information.

When the power transmission device 10 receives the setup frame from the power receiving device 40, the power receiving side communication condition/transmission condition/corresponding function information of the negotiation frame is written and stored in the power receiving side information register 110. Then, based on the power receiving side communication condition information and the power receiving side transmission condition information, the communication condition and the transmission condition after the start of normal power transmission are set. Further, based on the power receiving side corresponding function information and the power transmission side corresponding function information stored in the power transmission side information register 111, the usage function is set. That is, a function that both the power receiving side and the power transmission side can correspond to is set as the usage function.

Next, as shown in FIG. 7B, the power transmission device 10 makes a setup frame based on the power transmission side corresponding function information in the power transmission side information register 111 so as to transmit it to the power receiving device 40. The communication of the setup frame in this case is performed using the power transmission side communication condition information.

When the power receiving device 40 receives the setup frame from the power transmission device 10, the power transmission side corresponding function information of the setup frame is written and stored in the power transmission side information register 131. Then, based on the power transmission side corresponding function information and the power receiving side corresponding function information stored in the power receiving side information register 130, the usage function is set.

Next, as shown in FIG. 7C, normal power transmission (a charge) is started. The normal power transmission in this case is performed using the driving voltage (VF) and the driving frequency (f1) of the power receiving side transmission condition information set in the power receiving side information register 110 by the setup processing shown in FIG. 7A. Accordingly, the power transmission device can correspond to various power receiving devices having different power specifications.

Figure 8A:
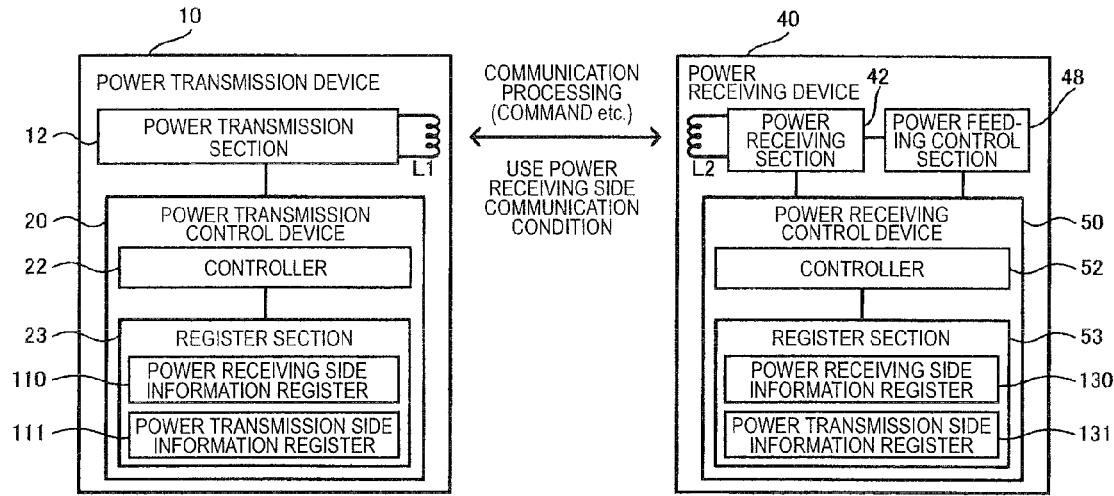
FIGS. 8A, 8B, and 8C are schematic views explaining the operation according to the embodiment.

As shown in FIG. 8A, when the communication processing of the command (the communication interruption request command, the full charge detection command, the recharge confirmation command, and the like) is performed after the start of normal power transmission, is it performed using the communication method (method) and the communication parameter (f2, SIHG2) of the power receiving side communication condition information set in the power receiving side information register 110 by the setup processing shown in FIG. 7A. Accordingly, the communication processing can be performed with an appropriate communication condition in accordance with power of the normal power transmission, thereby a stable communication processing can be realized.

Figure 8B:
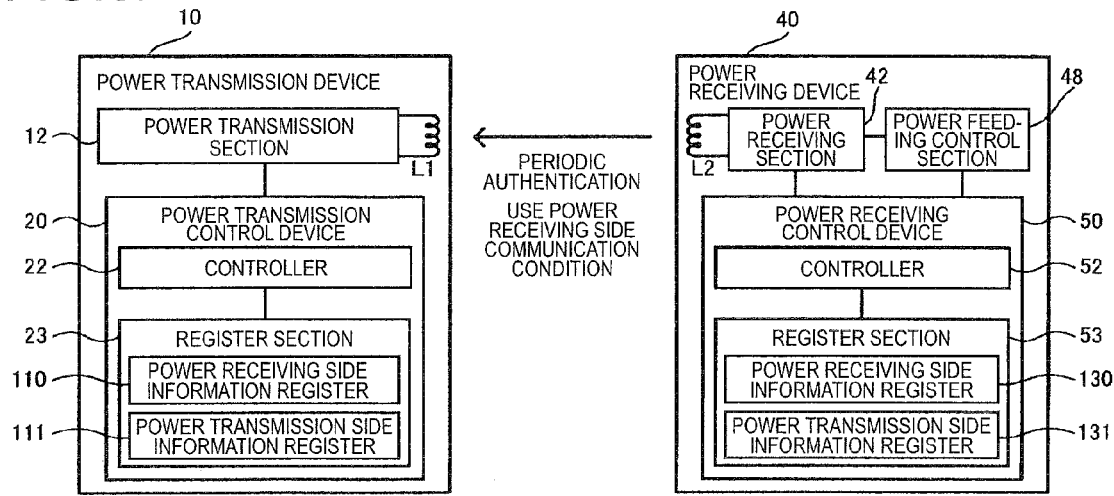

As shown in FIG. 8B, after the start of normal power transmission, in order to detect a takeover state caused by a metal foreign object and the like having a large area, periodic authentication is performed by a periodic load modulation. The periodic authentication in this case is performed using the communication parameter (LEVL, LEVH) of the power receiving side communication condition information set in the power receiving side information register 110 by the setup processing shown in FIG. 7A.

Figure 8C:
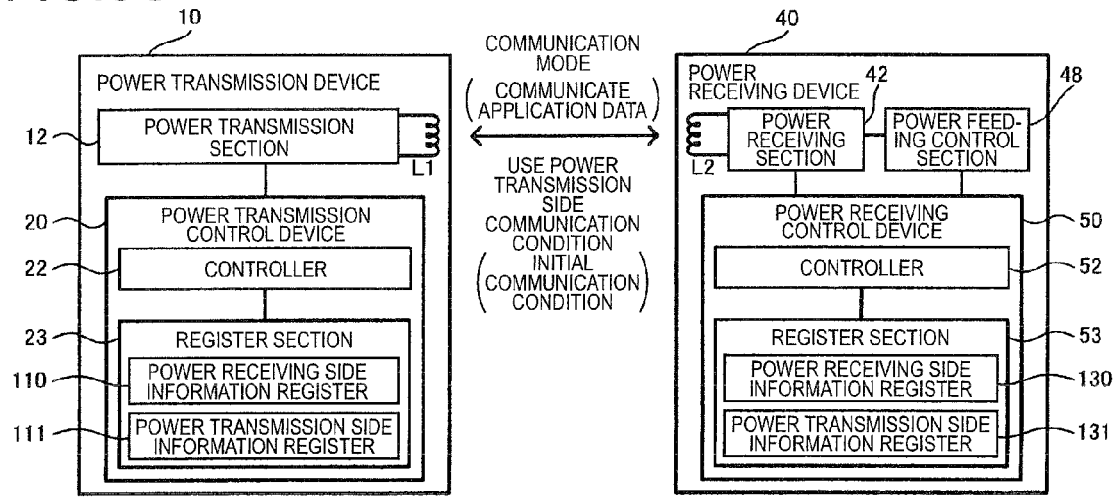

When the communication interruption request command is communicated and the power transmission side and the power receiving side move to the communication mode for application data and the like as shown in FIG. 8C, the communication condition and the transmission condition are switched to the power transmission side communication condition and the power transmission side transmission condition. That is, in the communication mode, since power feeding to the load 90 is stopped, the communication condition is switched to the power transmission side communication condition so as to communicate application data. The power transmission side communication condition is a safe and reliable communication condition for the temporary power transmission period.

5. Processing Sequence of Contactless Power Transmission

As contactless power transmission is widely used, it is expected that various types of secondary coils for the power receiving side are available in markets. That is, since electric apparatuses, such as cell phones, serving as the power receiving side have a wide variety of shapes and sizes, secondary coils installed in the power receiving devices of the electric apparatuses also have a wide variety of shapes and sizes. In addition, electronic apparatuses need a wide variety of electrical energy (wattages) and output voltages for contactless power transmission. As a result, the secondary coils have a wide variety of inductances and the like.

On the other hand, in contactless power transmission, power can be transmitted even if the shapes and the sizes of the primary coil and the secondary coil are not completely matched. In this regard, in a charge using a wired cable, such case can be prevented by devising a shape and the like of cable connectors. However, in contactless power transmission, such device is hard to be made.

Currently, each supplier employs an individual method to realize contactless power transmission.

However, in order to encourage broad use of contactless power transmission as well as ensure the safety in the use, it is preferable to realize a processing sequence of contactless power transmission with high versatility.

Figure 9:
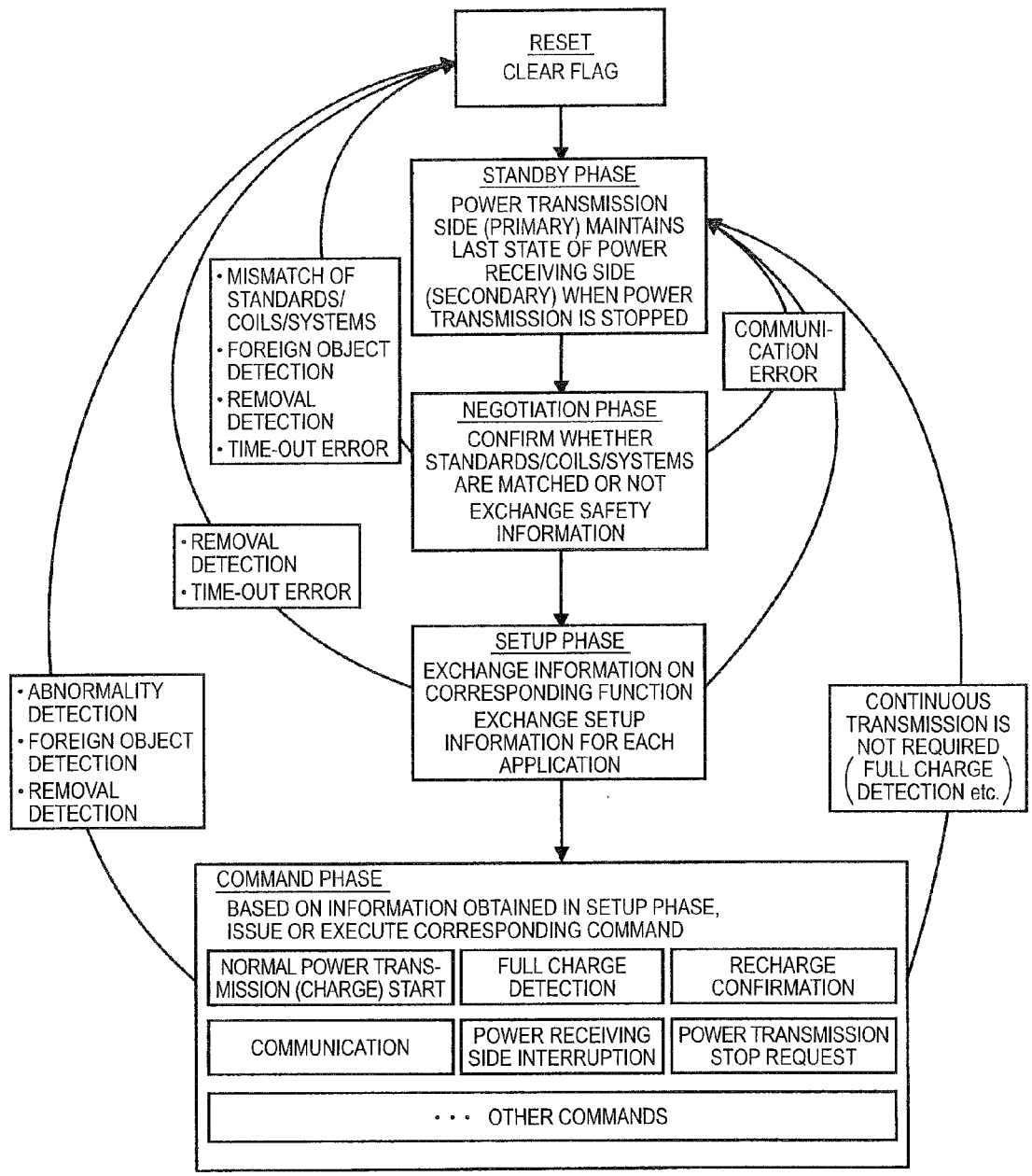
FIG. 9 is a schematic view explaining a processing sequence of the contactless power transmission.

FIG. 9 schematically shows a processing sequence of contactless power transmission realized by the embodiment.

In the processing sequence, the sequence moves to a standby phase after a reset state. In the reset state, various flags maintained on the power transmission side (the primary side) and the power receiving side (the secondary side) are cleared. Here, the flags represent states of the power transmission device and the power receiving device (a power transmission state, a full charge state, a recharge confirmation state, and the like), and kept in the registers of the devices.

In the standby phase, the power transmission side (the primary side) maintains the last state of the power receiving side (the secondary side) at the time of stoppage (at the time at which power transmission is stopped). For example, if a full charge of the battery is detected, the power transmission side and the power receiving side move to the standby phase after the detection of the full charge. In this case, since the battery needs to be recharged after detecting a battery voltage drop, the power transmission side stores that a factor of the power transmission stop is full charge detection. Specifically, a recharge confirmation flag is maintained in a set state without clearing it so as to periodically confirm whether or not a recharge is required.

In the standby phase, power transmission from the power transmission side to the power receiving side is stopped. As a result, a power supply voltage is not supplied to the power receiving side, so that the power receiving side is in a stop state. On the other hand, a power supply voltage is supplied to the power transmission side, so that the power transmission side is in an operating state. As described above, the power receiving side stops the operation in the standby phase, whereby achieving low power consumption. At this time, the power transmission side maintains the flags for various states without clearing them, so that the power transmission side can perform various processings using the flags after the standby phase.

The power transmission side and the power receiving side move to a negotiation phase after the standby phase. In the negotiation phase, the negotiation processing is performed in which a match of standards/coils/systems is confirmed and safety information is exchanged. Specifically, the power transmission side and the power receiving side exchange standard/coil/system information so as to confirm whether or not the information is compatible. In addition, for example, safety threshold information for detecting foreign objects and the like is transmitted from the power receiving side to the power transmission side so as to exchange safety information. In the negotiation processing, the following are confirmed: whether or not information can be communicated between the power transmission side and the power receiving side; whether or not the communicated information is adequate; whether or not a load state of the power receiving side is appropriate (undetection of foreign objects); and the like.

In the negotiation processing, the sequence moves to the reset state, and the various flags are cleared, if any of the following cases occur: a mismatch of standards/coils/systems is determined; a foreign object is detected; a removal of the apparatus is detected; and a time-out error occurs. On the other hand, if a communication error occurs, the sequence moves to the standby phase, for example, and the flags are not cleared.

The power transmission side and the power receiving side move to a setup phase after the negotiation phase. In the setup phase, the setup processing is performed in which setup information such as corresponding function information and setup information for each application is transferred. For example, based on a result of the negotiation processing, the authentication processing is performed so as to specify the transmission condition. Specifically, if the power receiving side transmits transmission condition information such as a driving voltage as well as a driving frequency of a coil to the power transmission side, the power transmission side sets a transmission condition for the normal power transmission such as the driving voltage and the driving frequency of the coil based on the received transmission condition information. In addition, information on a corresponding function and setup information different for every upper application is also exchanged in the setup processing. Specifically, in the setup processing, the following information is exchanged: threshold information for detecting a load state of the power receiving side after the start of normal power transmission (e.g., threshold information for data communication and foreign object detection); kinds of commands that the power transmission side and the power receiving side can issue and execute in a command phase; and an additional corresponding function such as a communication function and a periodic authentication function. Accordingly, setup information can be exchanged that is different for every application such as kinds (a cell phone, audio equipment, and the like) and models of electric apparatuses.

In the setup processing, the sequence moves to the reset state if a removal of the apparatus is detected or a time-out error occurs. On the other hand, if a communication error and the like occur, the sequence moves to the standby phase.

The power transmission side and the power receiving side move to the command phase after the setup phase. In the command phase, a command processing is performed based on the information obtained in the setup processing. That is, a corresponding command (a command that is confirmed to be available in the setup processing) is issued or executed. The command executed in the command processing includes, for example, a normal power transmission (a charge) start command, the full charge detection (notifying) command, the recharge conformation command, a communication command, a power receiving side interruption command, a power transmission stop request command.

For example, when normal power transmission is ready by the negotiation processing and the setup processing, the power transmission side transmits (issues) the normal power transmission (a charge) start command to the power receiving side. Then, the power receiving side receives the command and transmits a response command to the power transmission side so as to start the normal power transmission. If a full charge is detected on the power receiving side after the start of normal power transmission, the power receiving side transmits the full charge detection command to the power transmission side.

If continuous power transmission is not required as the full charge is detected, the sequence moves to the standby phase after the detection of the full charge. After going through the negotiation processing and the setup processing again, the power transmission side transmits the recharge confirmation command to the power receiving side. When receiving the command, the power receiving side checks a battery voltage so as to determine whether or not a recharge is required. If a recharge is required, the recharge confirmation flag is reset. Then, the process sequence moves to the negotiation phase. After the authentication processing and the setup processing are performed, the power transmission side issues the normal power transmission start command so as to restart the normal power transmission. On the other hand, if a recharge is not required, the recharge confirmation flag is maintained in the set state. Then, the sequence returns to the standby phase after the detection of the full charge.

If any abnormality, a foreign object, or a removal is detected in the command processing, the sequence moves into the reset state.

Figure 10:
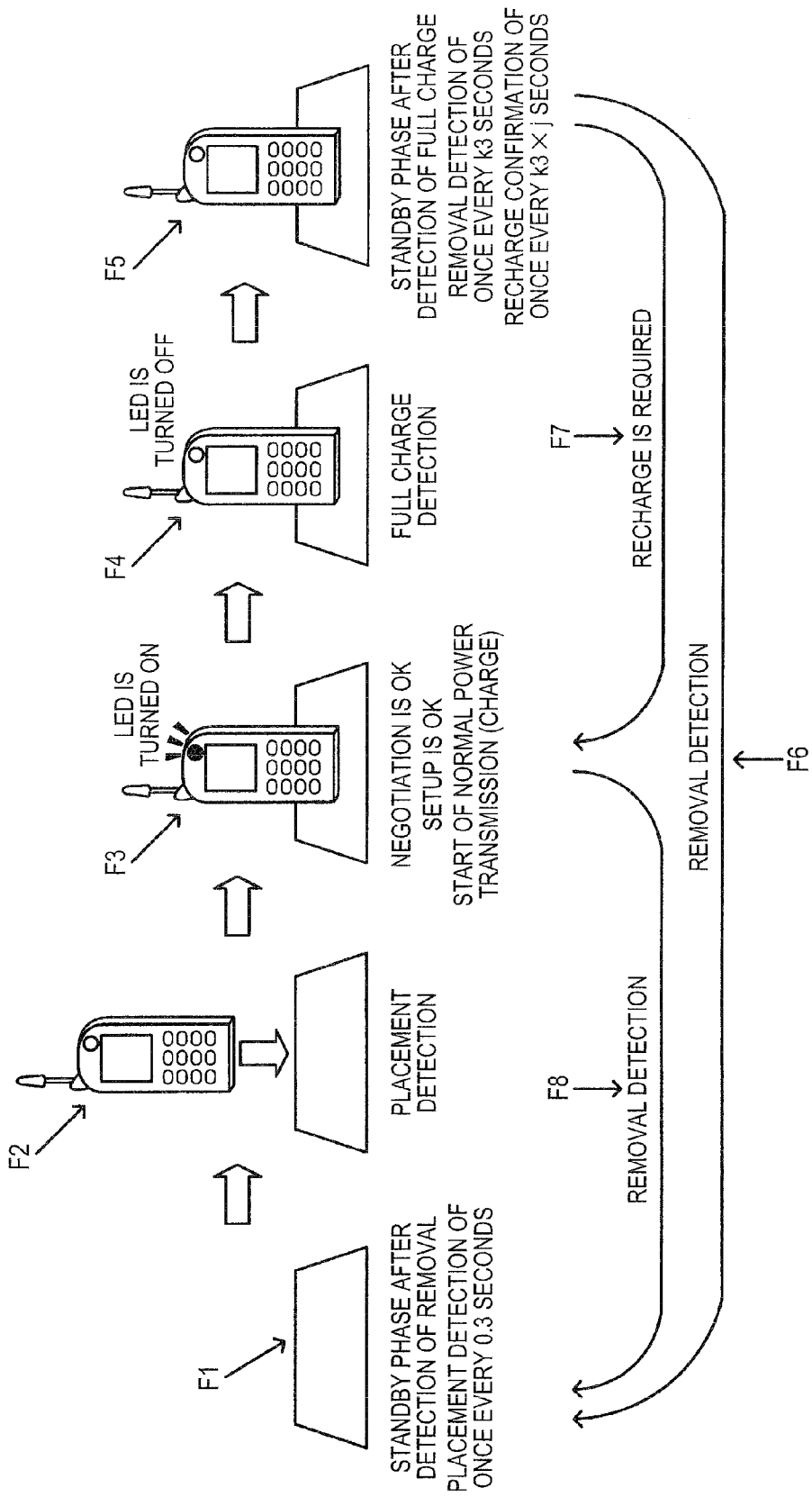
FIG. 10 is a schematic view explaining a processing sequence of the contactless power transmission.

The processing sequence according to the embodiment is more specifically described with reference to FIG. 10. In the standby phase after the detection of the removal shown in F1, placement detection is performed once every k1 seconds, for example. As shown in F2, if a placement (an installation) of the electronic apparatus is detected, the negotiation processing and the setup processing are performed. As shown in F3, if the negotiation processing and the setup processing are normally ended, and the normal power transmission start command is issued in the command processing, the normal power transmission starts so as to start charging the electronic apparatus. As shown in F4, if a full charge is detected, an LED of the electronic apparatus is turned off. Then, the sequence moves to the standby phase after the detection of the full charge as shown in F5.

In the standby phase after the detection of the full charge, for example, removal detection is performed once every k3 seconds and a recharge is confirmed once every k3×j seconds. Then, in the standby phase after the detection of the full charge, if a removal of the electronic apparatus is detected as shown in F6, the sequence moves to the standby phase after the detection of the removal. On the other hand, in the standby phase after the detection of the full charge, if it is determined that a recharge is required by the recharge confirmation as shown in F7, the negotiation processing and the setup processing are performed. Then, the normal power transmission is restarted so as to start recharging the battery. If a removal of the electric apparatus is detected during the normal power transmission as shown in F8, the sequence moves to the standby phase after the detection of the removal.

FIG. 11A shows a format example of the negotiation frame transferred in the negotiation processing. The negotiation frame includes a beginning field, an information field, and a final field. The information field includes a matching code and a hardware information code.

FIG. 11B shows a format example of the matching code. The matching code includes a command ID, a standard code, an extension code, and a coil code.

The command ID is an ID indicating the matching code. The standard code indicates a version of the standard. The extension code indicates an ID code system. For example, a code length is controlled by an extension code management ledger and the like.

The coil code indicates coil information, and for example, includes a classification code and a coil ID (coil identification information). The classification code is used for designating an administrator of the coil ID. The coil ID is given to the primary coil (a primary coil unit) by the administrator. That is, an ID of the primary coil, on the power transmission side, is not only given to the power transmission side but also given to the power receiving side as a coil ID. The definition of the coil ID changes depending on the extension code. For example, if the extension code is a first setting, the coil code is set so as to be segmented into the classification code and the coil ID. On the other hand, if the extension code is a second setting, the coil code is set without being segmented into the classification code and the coil ID.

FIG. 11C shows a format example of the hardware information code. The hardware information code includes a system code and a foreign object threshold. The system code indicates system information, and specifically is information indicating a method for detecting load states of the power transmission side and the power receiving side. Examples of the method for detecting a load state include a pulse width detection method (a phase detection method), a current detection method, a peak voltage detection method, and a combination thereof. The system code indicates either one method employed out of the methods by the power transmission side and the power receiving side.

The foreign object threshold is safety threshold information. The foreign object threshold is, for example, stored in the power receiving side, and is transmitted from the power receiving side to the power transmission side before the start of normal power transmission. The power transmission side, based on the foreign object threshold, performs first foreign object detection that is foreign object detection before the start of normal power transmission. For example, if a load state of the power receiving side is detected by the pulse width detection method, a threshold of a pulse width count value is transmitted from the power receiving side to the power transmission side as a foreign object threshold. Based on the threshold of the pulse width count value, the power transmission side performs the first foreign object detection by the pulse width detection method.

Figure 12:
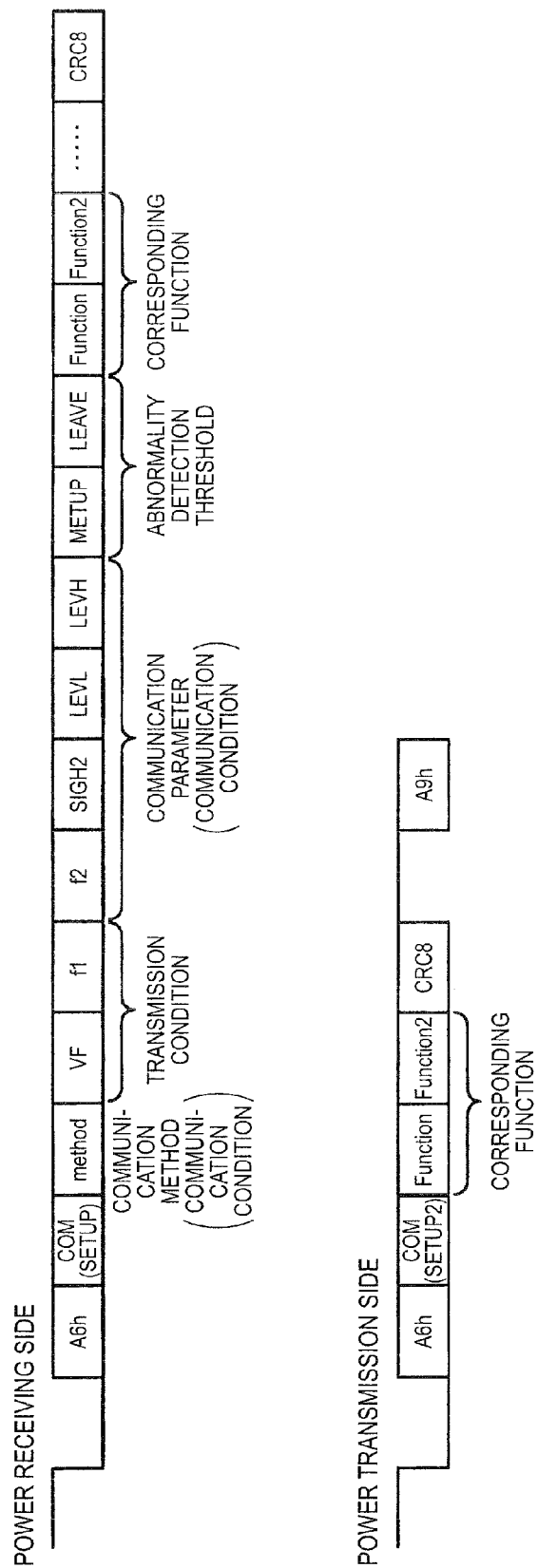
FIG. 12 is an example of a setup frame.

FIG. 12 shows an example of the setup frame transferred in the setup processing. As shown in FIG. 12, in the setup frame transmitted from the power receiving side, information on the communication method (method), the transmission condition (VF, f1), the communication parameter (f2, SIGH2, LEVL, LEVH) are set after a command indicating a setup. Further, information on the abnormality detection threshold (METUP, LEAVE) for performing such as overload detection and removal detection, and a corresponding function (Function, Function2), on the power receiving side, are set. In the setup frame transmitted from the power transmission side, information on the corresponding function (Function, Function2), on the power transmission side, is set after the command indicating a setup.

According to the processing sequence of the embodiment, the compatibility of standards/coils/systems is determined and the minimum safety information is exchanged in the negotiation processing. Further, in the negotiation processing, the possibility of communication and the adequacy of the communication information are determined as well as the propriety of a load state of the power receiving side is determined.

In the setup processing, a set up and the like of a transmission condition required for the normal power transmission is performed. For example, the driving voltage and the driving frequency of the coil are set. In addition, in the set up processing, threshold information for detecting a load state after the start of normal power transmission is transferred, and information on an additional corresponding function and setup information required for each upper application are exchanged.

After going through the setup processing and the negotiation processing, the sequence moves to the command phase so as to perform the command processing. That is, a command confirmed that it is available in the negotiation processing and the setup processing is issued or executed in the command processing.

Accordingly, the minimum information required for securing the compatibility and the safety of the system is exchanged in the negotiation processing, and the setup information different for each application is exchanged in the setup processing. As a result, if information on the power transmission side is not compatible with that on the power receiving side, it is excluded in the negotiation processing, thereby the setup information having a large volume of information is not transferred. In the negotiation processing, only the minimum information is transferred, thereby an amount of transferred information can be reduced. Thus, the negotiation phase is ended in a short time, allowing achieving an efficient processing.

Each apparatus on the power transmission side and the power receiving side can perform minimum contactless power transmission by the negotiation processing, and each apparatus can expand the function by exchanging the setup information. Each apparatus makes the minimum setting required for a contactless power transmission system in the negotiation processing, and the system can be optimized in the setup processing. As a result, a flexible system can be realized.

The power transmission side receives threshold information and system information from the power receiving side, and can realize contactless power transmission and foreign object detection only by setting the received threshold information and the system information. Therefore, the processings on the power transmission side can be simplified. In this case, the power receiving side transmits coil information of an appropriate combination and threshold information to the power transmission side, so that appropriate and safe contactless power transmission can be realized.

6. Coil Information

According to the embodiment, as shown in FIG. 6B, in the negotiation processing, power receiving side coil information in the power receiving side information register 130 is transferred and written in the power receiving side information register 110 of the register section 23 on the power transmission side. Then, the collation processing of the power receiving side coil information and power transmission side coil information stored in the power transmission side information register 111 is performed. Hereinafter, the collation processing of the coil information will be specifically described.

For example, as shown in FIG. 13, as an appropriate combination of coil for a primary coil X (a primary coil of a first type in a broad sense), secondary coils XA, XB, and XC (secondary coils of a first to an N types in a broad sense) are corresponded. That is, a combination of the primary coil X and the secondary coils XA, XB, or XC is an appropriate combination. With this combination, it is assured that appropriate contactless power transmission can be realized. Likewise, secondary coils YA, YB, and YC correspond to a primary coil Y.

In FIG. 13, not an ID of the secondary coil itself, but an ID of the primary coil corresponded to the secondary coil is given to the secondary coil. For example, if a coil ID of the primary coil X is CID=IDX, then, IDX, the ID of the primary coil X, is given to the secondary coils XA, XB, and XC that belong to the primary coil X. Likewise, if a coil ID of the primary coil Y is CID=IDY, IDY, the ID of the primary coil Y, is given to the secondary coils YA, YB, and YC that belong to the primary coil Y.

That is, the power transmission side information register 111 of the power transmission device 10 including the primary coil X stores IDX, the coil ID of the primary coil X, as power transmission side coil information. The power receiving side information register 130 of the power receiving device 40 including the secondary coil XA also stores IDX, the corresponding coil ID of the primary coil X, as power receiving side coil information.

Then, for example, the power receiving device 40 transmits IDX, the coil ID of the primary coil X, as the power receiving side coil information before the start of normal power transmission. The power transmission device 10 determines whether or not IDX of power transmission side coil information is matched with IDX of the received power receiving side coil information from the power receiving device 40. If they are matched, normal power transmission is started.

For example, the power receiving device 40 including the secondary coil YA transmits IDY, power receiving side coil information, to the power transmission device 10 including the primary coil X. In this case, since IDX, the power transmission side coil information, and IDY, the power receiving side coil information, do not match, normal power transmission and the like are not performed.

In this way, in FIG. 13, an ID of the primary coil to which the secondary coil itself belongs is given to each secondary coil. Accordingly, in the secondary coil, only the ID of its primary coil is required to be stored, and an ID of the secondary coil is not required to be stored. Therefore, management and the like can be simplified. For example, in an incompatible combination, such as the primary coil X and the secondary coil YA, since the coil IDs do not match, normal power transmission is not performed. Accordingly, even if there appear various types of secondary coils, appropriate contactless power transmission can be realized.

7. Test Mode

In product development, it is required to set the power transmission control device 20 and the like to a test mode so as to perform various debugging operations. However, as the embodiment employing a method in which an information register is separated into the power transmission side information register 111 and the power receiving side information register 110, it may not realize to effectively perform debugging.

That is, the power receiving side information that is a fixed value is transferred from the power receiving device 40 and written in the power receiving side information register 110. Accordingly, since the debugging cannot be performed by setting the authentication/transmission condition/communication condition/abnormality detection/corresponding function information on power receiving side shown in FIG. 4 to various values, flexibility and efficiency of tests are decreased.

Figure 14A:
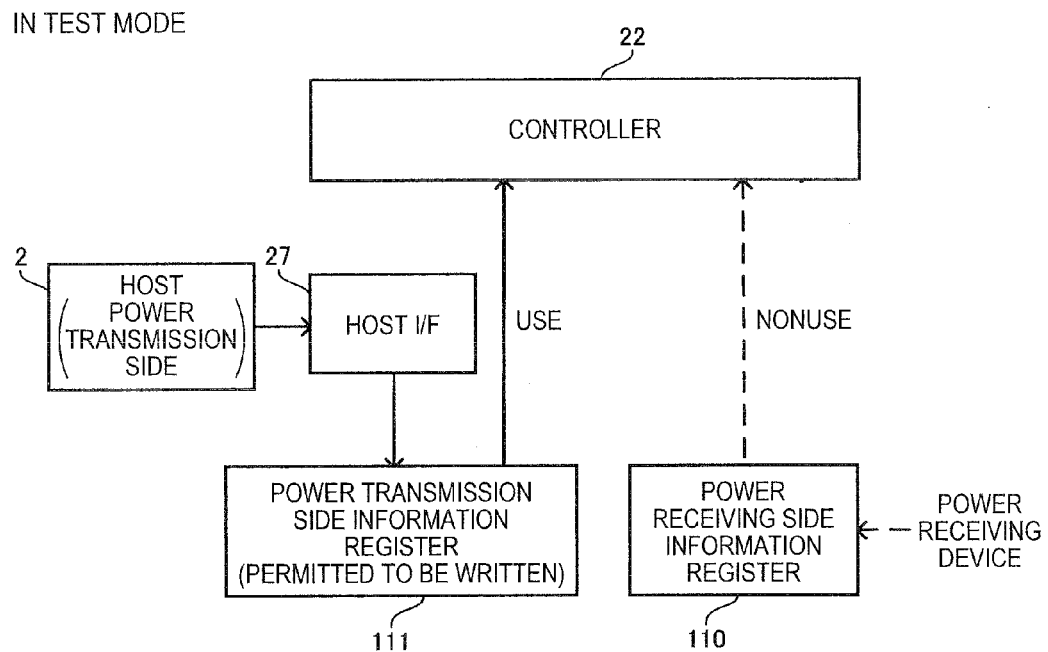
FIGS. 14A and 14B are explanatory diagrams of a test mode.

In FIG. 14A, the controller 22 is set such that in the test mode (a debugging mode), the authentication processing, the power transmission control, and the communication processing are performed using the power transmission side information stored in the power transmission side information register 111 without using the power receiving side information stored in the power receiving side information register 110. That is, the existence of the host I/F 27 is focused, and the host 2 rewrites the content of the power transmission side information register 111 through the host I/F 27. This allows the authentication processing, the power transmission control, and the communication processing to be debugged.

Specifically, in the negotiation processing, when the controller 22 receives the power receiving side authentication information (coil information and the like) from the power receiving device 40, the power receiving side authentication information is returned to the power receiving device 40 as it is. In the setup processing, when the controller 22 receives the corresponding function information, the corresponding function information is returned to the power receiving device 40 as it is. Further, in the setup processing, even if the controller 22 receives the power receiving side transmission condition/communication condition information from the power receiving device 40 and the information is written in the power receiving side information register 110, the controller 22 uses the power transmission side transmission condition/communication condition information after the start of normal power transmission. The controller 22 does not use the power receiving side transmission condition/communication condition information. Specifically, the host 2 rewrites the driving voltage, the driving frequency, the communication parameter, and the like to a desired value through the host I/F 27 so as to perform debugging (test).

Accordingly, the driving voltage, the driving frequency, the communication parameter, and the like that are a fixed value and are received from the power receiving device 40 are not used. This allows the driving voltage, the driving frequency, and the communication parameter to be varied so as to perform debugging. As a result, flexibility and efficiency of tests are improved. For example, the driving voltage is varied to various voltages, so that tests on a multi-power adaptive system can be realized.

As shown in FIG. 14A, in the test mode, if the host 2 is allowed to write in the power transmission side information register 111, important information may be rewritten by users and the like.

Figure 14B:
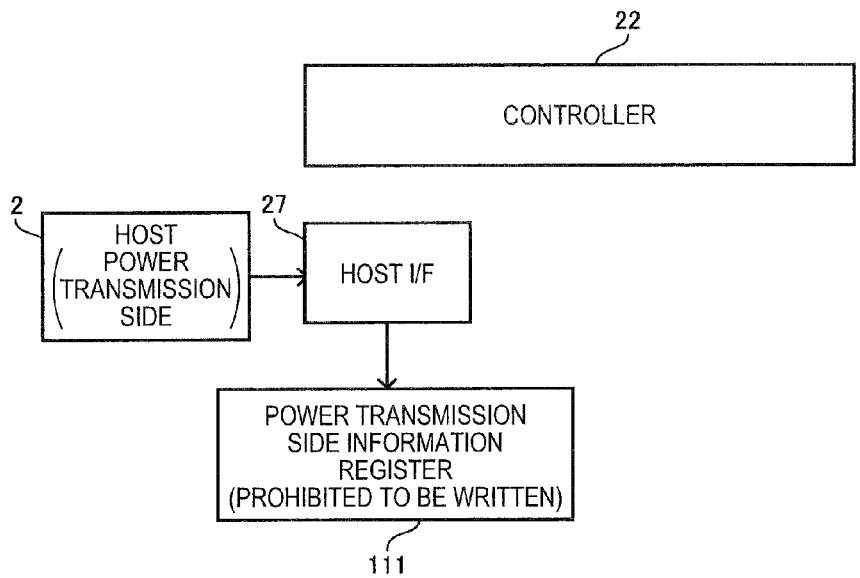

As shown in FIG. 14B, at least one of the registers of the power transmission side information register 111 are preferably set to be switchable between two states giving the host 2 a write-permission and a write-prohibition through the host I/F 27. Specifically, for example, the power transmission side authentication information, transmission condition information, communication condition information, and abnormality detection information registers shown in FIG. 4 are set to be switchable between the write permission and the write prohibition. For examples the registers are permitted to be written (accessed) in the test mode while the registers are prohibited from being written in the mass production. Alternatively, the registers may be prohibited from being written in the test mode as well.

Accordingly, information in the registers can be prevented from being rewritten by users and the like, so that reliability and the like can be improved.

The write-permission and the write-prohibition can be switched using a fuse and the like. For example, in the test mode, information stored in the power transmission side information register 111 is rewritten to various values so as to perform debugging. In the mass production, the fuse corresponding to each register that is subjected to be prohibited from being written is blown and the like so that the register is protected from being written. Further, an EEPROM is used instead of the fuse, or a write-prohibited circuit is provided so that the registers may be switched between the write-permission and the write-prohibition.

8. Specific Structural Example

Figure 15:
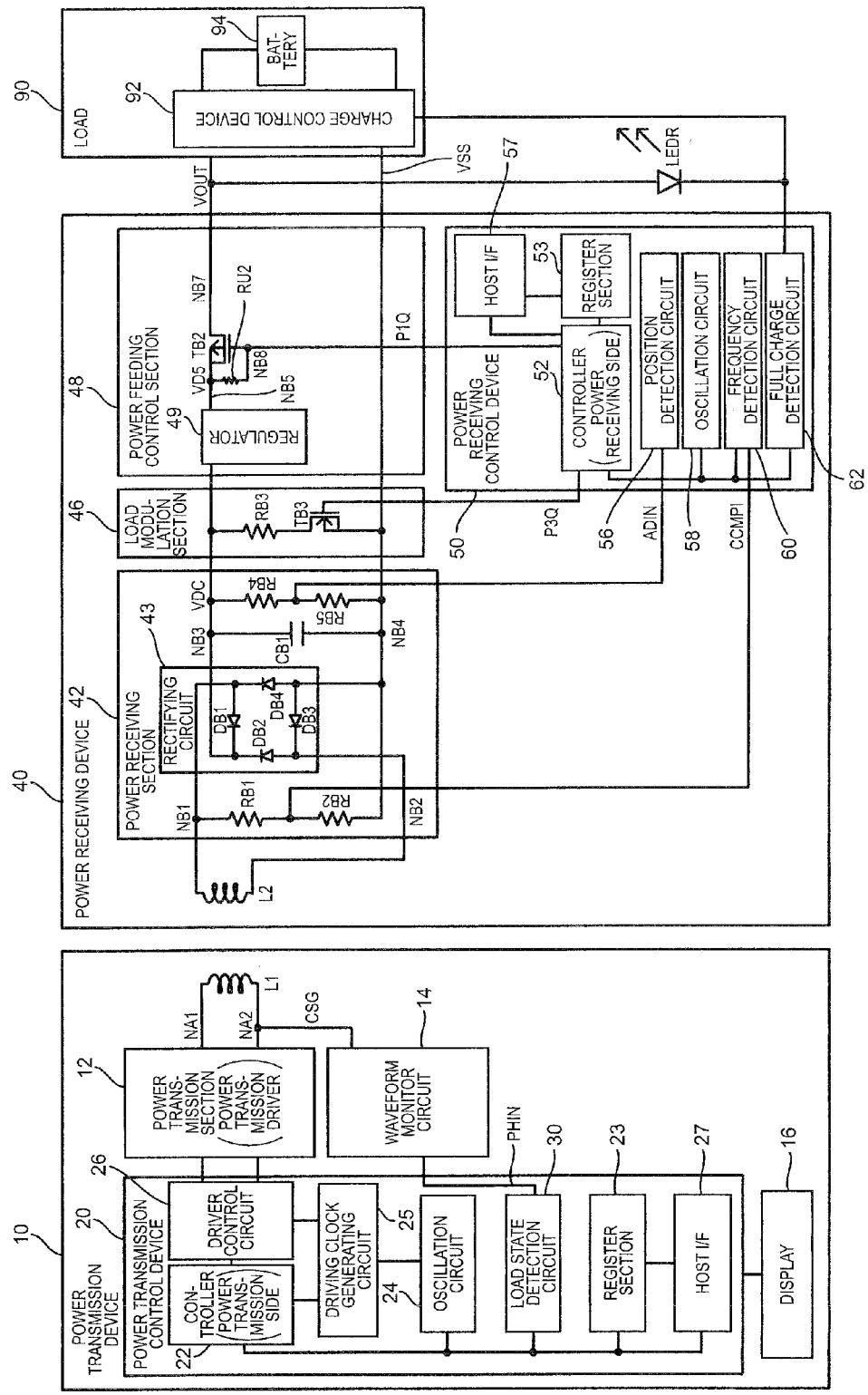
FIG. 15 is a specific structural example of the power transmission device, the power transmission control device, the power receiving device, and the power receiving control device according to the embodiment.

A detailed structural example of the embodiment is shown in FIG. 15. Hereinafter, the elements described in FIG. 2 are indicated by the same numerals and the description thereof is omitted.

A waveform monitor circuit 14, based on a coil terminal signal CGS of the primary coil L1, generates an induced voltage signal PHIN for a waveform monitor. For example, the coil terminal signal CGS that is an induced voltage signal of the primary coil L1 may exceed a maximum rating voltage of an IC of the power transmission control device 20 or have a negative voltage. The waveform monitor circuit 14 receives the coil terminal signal CGS so as to generate the induced voltage signal PHIN for a waveform monitor and outputs it to, for example, a terminal for a waveform monitor of the power transmission control device 20. The induced voltage signal PHIN is capable of being detected as a waveform by the load state detection circuit 30 of the power transmission control device 20. A display 16 displays various states of the contactless power transmission system (in power transmitting, ID authenticating, and the like) with colors, images, and the like.

An oscillation circuit 24 generates a clock for the primary side. A driving clock generation circuit 25 generates a driving clock defining a driving frequency. A driver control circuit 26, based on the driving clock from the driving clock generation circuit 25 and a frequency set signal from the controller 22, generates a control signal having a desired frequency. Then, the control signal is outputted to first and second power transmission drivers of the power transmission section 12 so as to control the first and the second power transmission drivers.

The load state detection circuit 30 shapes a waveform of the induced voltage signal PHIN so as to generate a waveform shaping signal. For example, the load state detection circuit 30 generates a waveform shaping signal (a pulse signal) of a square wave (a rectangular wave). The square waveform becomes active (e.g., an H level) if the signal PHIN is beyond a predetermined threshold voltage. The load state detection circuit 30, based on the waveform shaping signal and the driving clock, detects pulse width information (a pulse width period) on the waveform shaping signal. Specifically, the load state detection circuit 30 receives the waveform shaping signal and the driving clock from the driving clock generation circuit 25 so as to detect pulse width information on the waveform shaping signal. Accordingly, the pulse width information on the induced voltage signal PHIN is detected.

As for the load state detection circuit 30, the detection method is not limited to the pulse width detection method (phase detection method). Various methods such as the current detection method and the peak voltage detection method can be employed.

The controller 22 (the power transmission control device), based on a detection result in the load state detection circuit 30, determines a load state (load fluctuation, a degree of the load) of the power receiving side (the secondary side). For example, the controller 22, based on the pulse width information detected in the load state detection circuit 30 (a pulse width detection circuit), determines a load state of the power receiving side so as to perform detection, for example, data (load) detection, foreign object (metal) detection, removal (placement and removal) detection, and the like. That is, a pulse width period that is pulse width information of the induced voltage signal varies in accordance with a load state of the power receiving side. The controller 22 can detect load fluctuation of the power receiving side based on the pulse width period (a count value obtained by measuring the pulse width period).

The power receiving section 42 converts an alternating induced voltage of the secondary coil L2 into a direct current voltage. The conversion is performed by a rectifying circuit 43 included in the power receiving section 42.

The load modulation section 46 performs a load modulation processing. Specifically, when desired data is transmitted from the power receiving device 40 to the power transmission device 10, a load on the load modulation section 46 (the secondary side) is varied so as to vary a signal waveform of the induced voltage of the primary coil L1. Therefore, the load modulation section 46 includes a resistance RB3 and a transistor TB3 (an N-type CMOS transistor) that are provided in series between nodes NB3 and NB4. The transistor TB3 is on/off-controlled by a signal P3Q from the controller 52 of the power receiving control device 50. When the transistor TB3 is on/off-controlled so as to perform a load modulation, a transistor TB2 of the power feeding control section 48 is turned off. As a result, the load 90 is in a state of not being electrically coupled to the power receiving device 40.

The power feeding control section 48 controls power feeding to the load 90. A regulator 49 regulates a voltage level of a direct current voltage VDC obtained by the conversion in the rectifying circuit 43 so as to generate a power supply voltage VD5 (e.g., 5V). The power receiving control device 50 operates with a supply of the power supply voltage VD5, for example.

The transistor TB2 (a P-type CMOS transistor, a power feeding transistor) is controlled by a signal P1Q from the controller 52 of the power receiving control device 50. Specifically, the transistor TB2 is turned off during the negotiation processing and the setup processing while turned on after the start of normal power transmission.

A position detection circuit 56 determines whether or not a positional relation between the primary coil L1 and the secondary coil L2 is appropriate. An oscillation circuit 58 generates a clock for the secondary side. A frequency detection circuit 60 detects a frequency (f1, f2) of a signal CCMPI. A full charge detection circuit 62 detects whether or not the battery 94 (a secondary battery) of the load 90 is in a full charge state (a charged state).

The load 90 may include a charge control device 92 controlling a charge and the like of the battery 94. The charge control device 92 (a charge control IC) can be realized by an integrated circuit device or the like. Further, as a smart battery, the battery 94 itself may have a function of the charge control device 92.

9. Specific Operational Example

Figure 16:
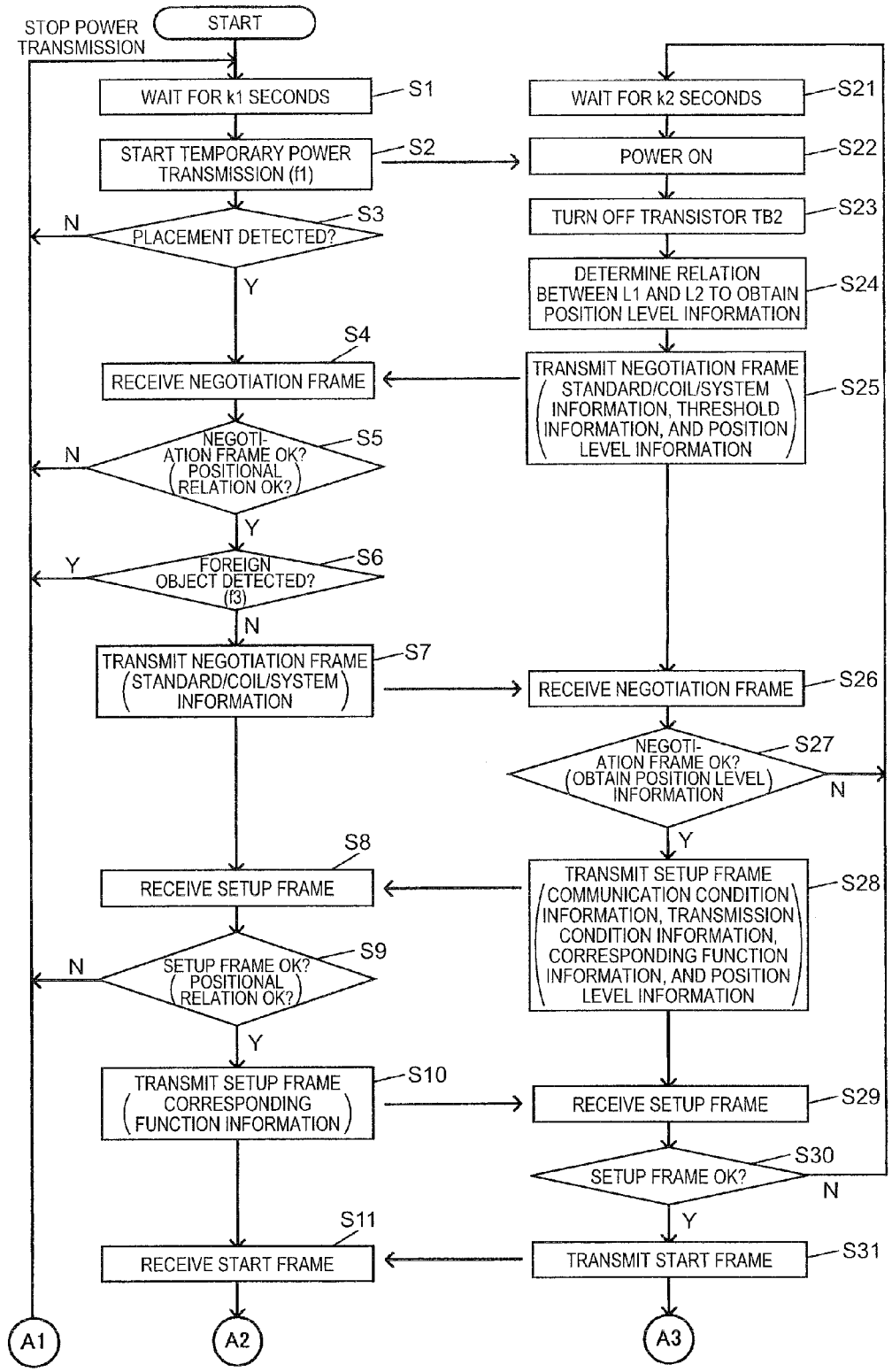
FIG. 16 is a flowchart explaining the operation according to the embodiment.

Next, operations on the power transmission side and the power receiving side will be described in detail with reference to flowcharts shown in FIGS. 16 to 18. In FIG. 16, a processing flow on the power transmission side is shown in a left column while that on the power receiving side is shown in a right column.

As shown in FIG. 16, as being turned on, the power transmission side, for example, after a wait of k1 seconds (step S1), performs temporary power transmission before the start of normal power transmission (step S2). The temporary power transmission is temporary electric power transmission for placement detection, position detection, and the like. That is, the power is transmitted for detecting whether or not the electric apparatus is placed on the charger, and, if the electric apparatus is placed, whether or not the electric apparatus is placed on an appropriate position. A driving frequency (a frequency of a driving clock from the driving clock generation circuit) in the temporary power transmission is set to f1 (f01), for example.

The temporary power transmission from the power transmission side allows the power receiving side to be turned on (step S22), thereby the power receiving control device 50 performs a power-on-reset. Then, the power receiving control device 50 sets the signal P1Q to the H level. As a result, the transistor TB2 (a power feeding transistor) of the power feeding control section 48 is turned off (step S23), so that the electrical connection between the power receiving side and the load 90 is interrupted.

Next, the power receiving side determines by using the position detection circuit 56 a positional relation (a position level) between the primary coil L1 and the secondary coil L2 so as to obtain positional level information that is positional relation information (step S24).

Then, whether or not the positional relation is appropriate, the power receiving side makes a negotiation frame so as to transmit it to the power transmission side (step S25). Specifically, the negotiation frame is transmitted by the load modulation. The negotiation frame includes, for example, a matching code such as standard information and coil information, system information (a load state detection method), and hardware information such as threshold information (a threshold for detecting a load state) stored in the register section 53 on the power receiving side. Further, the positional level information (positional relation information) obtained in the step S24 is additionally included in the negotiation frame.

Receiving the negotiation frame (step S4), the power transmission side verifies the negotiation frame (step S5). Specifically, it is determined whether or not the standard/coil/system information stored in the register section 23 on the power transmission side and the standard/coil/system information received from the power receiving side are a combination within an application range. Based on the positional level information additionally included in the negotiation frame, the positional relation between the primary coil L1 and the secondary coil L2 is also determined. Then, if the negotiation frame is determined to be appropriate, foreign object detection is performed (step S6).

Specifically, the power transmission side sets a driving frequency to a frequency f3 for detecting a foreign object. Then, based on the threshold information (safety threshold information) received from the power receiving side, first foreign object detection before the start of normal power transmission is performed so as to determine whether or not a load state of the power receiving side is appropriate. For example, a foreign object detection enable signal is activated so as to instruct the load state detection circuit 30 to start detecting a foreign object. The foreign object detection can be realized by comparing, for example, load state detection information (pulse width information) from the load state detection circuit 30 with a threshold (META) for detecting a load state received from the power receiving side. After the period of detecting a foreign object ends, the power transmission side returns the driving frequency to the frequency f1 (f01).

If the negotiation frame is determined to be inappropriate in the step S5 or a foreign object is detected in the step S6, the power transmission side stops power transmission so as to return to the step S1.

Next, the power transmission side makes a negotiation frame so as to transmit it to the power receiving side (step S7). The negotiation frame includes, for example, standard information, coil information, and system information stored in the register section 23 on the power transmission side.

Receiving the negotiation frame (step S26), the power receiving side verifies the negotiation frame (step S27). Specifically, it is determined whether or not the standard/coil/system information stored in the register section 53 on the power receiving side and the standard/coil/system information received from the power transmission side are a combination within an application range. Further, the power receiving side redetermines the positional relation between the primary coil L1 and the secondary coil L2 so as to obtain positional level information. Then, if the negotiation frame is determined to be appropriate, the power receiving side generates a setup frame so as to transmit it to the power transmission side (step S28). The setup frame includes communication condition information, transmission condition information, corresponding function information, and positional level information. The communication condition information includes a communication method, a communication parameter, and the like. The transmission condition information includes the driving voltage and the driving frequency of the primary coil, and the like. The corresponding function information represents a function added to each application. If the negotiation frame is inappropriate, the power receiving side returns to the step S21.

Receiving the setup frame (step S8), the power transmission side verifies the setup frame (step S9). If the setup frame from the power receiving side is appropriate, the power transmission side makes a setup frame on the power transmission side so as to transmit it to the power receiving side (step S10). On the other hand, if the setup frame is inappropriate, the power transmission side stops power transmission so as to return to the step S1.

Receiving the setup frame (step S29), the power receiving side verifies the setup frame (step S30). If the setup frame is appropriate, the power receiving side makes a start frame so as to transmit it to the power transmission side (step S31). On the other hand, if the setup frame is inappropriate, the power receiving side returns to the step S21.

If the start frame is transmitted, the power transmission side and the power receiving side move to a command branch. That is, a command determination is performed so as to be split into one of command processings corresponding to each flag.

Figure 17:
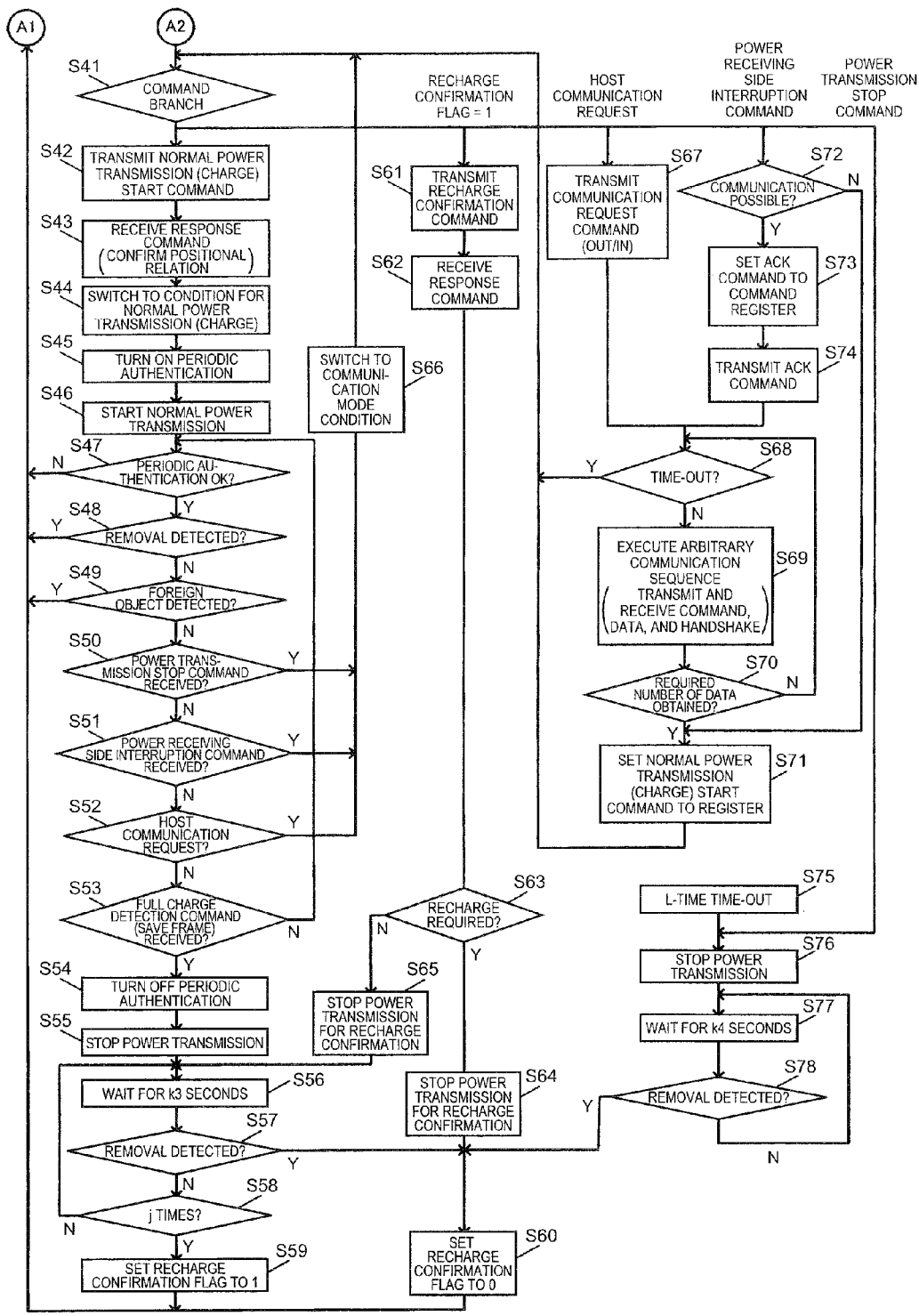
FIG. 17 is a flowchart explaining the operation according to the embodiment.

FIG. 17 is a flowchart showing processings on the power transmission side after the command branch. As shown in FIG. 17, at the command branch of step S41, if there is no other command requiring a priority processing (e.g., the communication request command, the interruption command, a power transmission stop command, recharge confirmation flag=1, and the like), the power transmission side transmits the normal power transmission (a charge) start command to the power receiving side (step S42). Receiving a response command of the normal power transmission start command from the power receiving side, based on the positional level information additionally included in the received response command, a positional relation between the primary coil L1 and the secondary coil L2 is confirmed (step S43). Then, the transmission condition and the communication condition are switched to the normal power transmission condition (step S44). Specifically, the conditions are switched to the transmission condition and the communication condition set in the setup processing. Then, periodic authentication is turned on (step S45), and normal power transmission is started (step S46).

After the start of normal power transmission, in the periodic authentication period performed by the periodic load modulation, the power transmission side performs detection of a takeover state caused by a metal foreign object and the like having a large area (step S47). Further, removal detection and foreign object detection are performed (steps S48, S49). If any takeover is detected in the periodic authentication, or a removal or a foreign object is detected, the power transmission is stopped so that the processing flow returns to the step S1.

Next, the power transmission side determines whether or not a power transmission stop command (a STOP command) from the host 4 on the power receiving side is received (step S 50). The power transmission side also determines whether or not an interruption command (the INT command) is received from the host 4 on the power receiving side (step S 51). Further, the power transmission side determines whether or not a host communication request (the OUT/IN transfer commands) is received from the host 2 on the power transmission side (step S 52).

If there is no reception of the command or the request, the power transmission side determines whether or not the full charge detection command (a save frame) is received from the power receiving side (step S53). If the command is not received, the processing flow returns to the step S47. On the other hand, if the command is received, the periodic authentication is turned off, and the power transmission is stopped (steps S54, S55). Then, the power transmission side moves to the standby phase after the detection of the full charge (step S56).

In the standby phase after the detection of the full charge, for example, removal detection is performed once every k3 seconds (step S57). Then, if a removal is detected, the recharge confirmation flag is reset to zero (step S60), and the power transmission is stopped so that the processing flow returns to the step S1.

Further, in the standby phase after the detection of the full charge, for example, confirmation of a recharge is performed once every k3×j seconds, and the recharge confirmation flag is set to one (steps S58, S59). Then, the power transmission is stopped so that the processing flow returns to the step S1.

If the recharge confirmation flag is set to one in the step S59, the negotiation processing and the setup processing are performed after the processing flow returns to the step S1. At the command branch of the step S41, since the recharge confirmation flag is one, the processing flow moves to processings for a recharge confirmation mode.

Specifically, the power transmission side transmits the recharge confirmation command to the power receiving side (step S61). Receiving a response command of the recharge confirmation command from the power receiving side (step S62), based on a check result of a battery voltage received together with the response command, the power transmission side determines whether or not a recharge of the battery 94 is required (step S63). If a recharge is determined to be required, the power transmission for confirming a recharge (temporary power transmission) is stopped (step S64). Then, the recharge confirmation command is set to zero so that the processing flow returns to the step S1. On the other hand, if no recharge is determined to be required, the power transmission for confirming a recharge is stopped (step S65). Then, the power transmission side returns to the standby phase after the detection of the full charge from the recharge confirmation mode (steps S56 to S58).

If it is determined that the power transmission stop command and the interruption command are received in the steps S50, S51 and there is a communication requested from the host 2 in the step S52, the power transmission side switches the transmission condition and the communication condition of contactless power transmission to the communication mode condition (a condition during the temporary power transmission) from the normal power transmission condition (step S66). For example, the driving frequency and the driving voltage are switched, or a threshold parameter for detecting a load state of the power receiving side is switched. Then, the processing flow moves to the command branch of the step S41.

For example, if it is determined that there is a communication request from the host 2, on the power transmission side, in the step S52, at the command branch of the step S41, the processing flow is split into processings for a communication mode by the host request. In the communication mode by the host request, the OUT transfer command or the IN transfer command, the communication request command issued by the host 2, are transmitted to the power receiving side (step S67). Then, waiting a response from the power receiving side, the power transmission side determines whether or not a time-out occurs (step S68). If the time-out occurs, the processing flow returns to the step S41. On the other hand, if no time-out occurs, the power transmission side performs an arbitrary communication sequence based on an agreement between the hosts 2 and 4 (step S69). That is, transmitting and receiving of command, data, and handshake is performed. Then, the power transmission side determines whether or not the required number of data is obtained (step S70). If the required number of data is obtained, the normal power transmission start command (a recharge start command) is set in the command register 114 (step S71), and the processing flow returns to the step S41. This enables the power transmission side to be returned to the normal power transmission mode (a charge mode) from the communication mode.

If it is determined that the interruption command (the INT command) is received from the power receiving side in the step S51, at the command branch of the step S41, the processing flow is split into processings for a communication mode by the interruption command from the power receiving side. In the communication mode by the interruption command from the power receiving side, first, the power transmission side determines whether or not communication can be performed in a current state (step S72). If the communication cannot be performed, the processing flow moves to the step S71. On the other hand, if the communication can be performed, the power transmission side sets the ACK command in the command register 114 so as to transmit it to the power receiving side (steps S73, S74). Then the processing flow moves to the processings for the communication mode in the steps S68 to S70.

If it is determined that the power transmission stop command (the STOP command) is received from the power receiving side in the step S50, at the command branch of the step S41, the processing flow is split into processings for the power transmission stop command. Then, the power transmission side stops the power transmission to the power receiving side (step S76), and performs detection of a removal every k3 seconds (steps S77, S78), for example. If a removal is detected, the processing flow moves to the step S60 and returns to the step S1. Further, if there is a time-out of L-time timer for clocking continuous charging time (step S75), the processing flow also moves to the step S76 and the power transmission is stopped. The time-out occurs when the timer measuring the continuous charging time since a start of power transmission reaches to the L-time.

Figure 18:
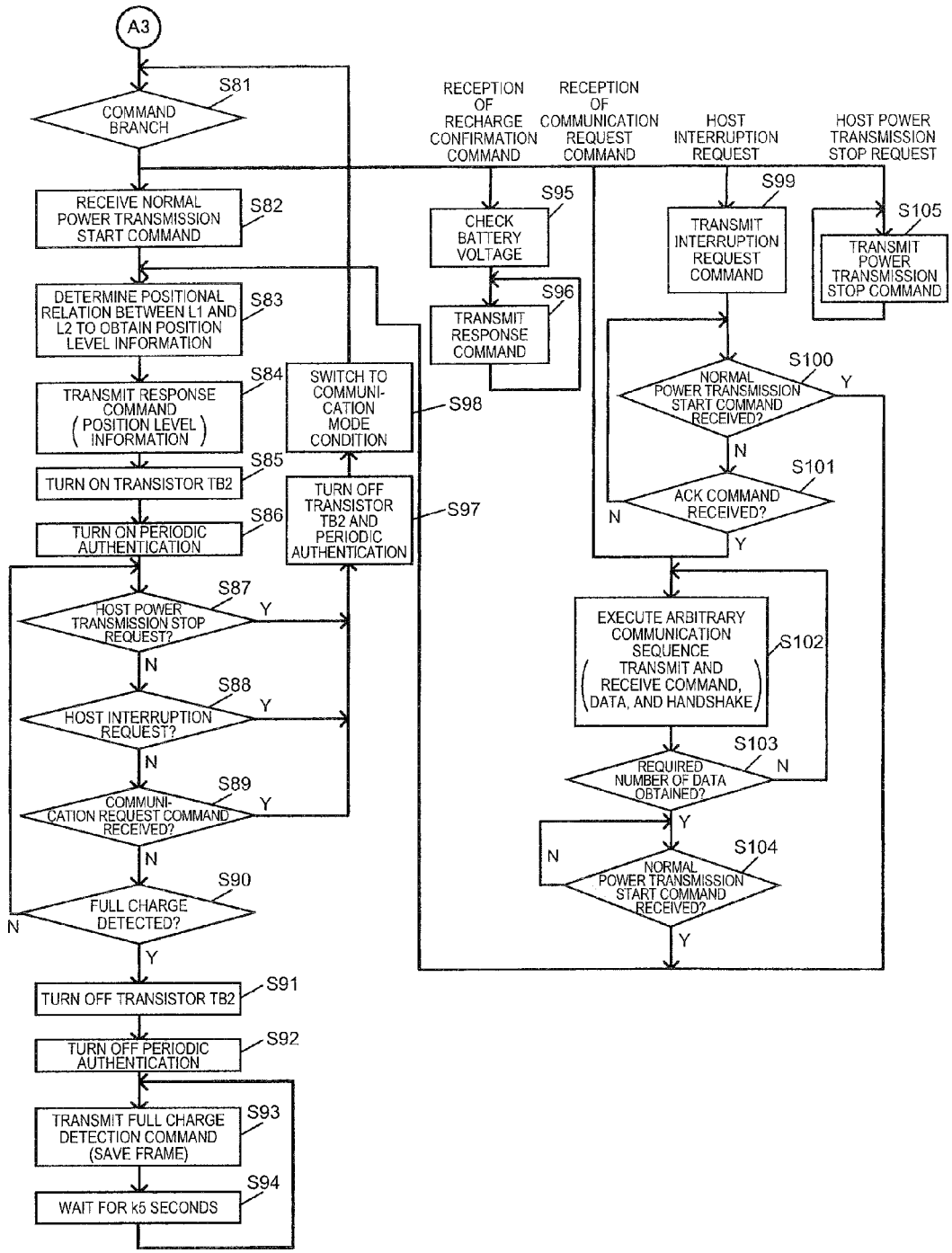
FIG. 18 is a flowchart explaining the operation according to the embodiment.

FIG. 18 is a flowchart showing processings on the power receiving side after the command branch. As shown in FIG. 18, at the command branch of step S81, there is no other command requiring a priority processing (the communication request command, the interruption command, the power transmission stop command, and the like), and receiving the normal power transmission start command from the power transmission side (step S82), the power receiving side redetermines the positional relation between the primary coil L1 and the secondary coil L2 so as to obtain position level information that is positional relation information (step S83). Then, the power receiving side transmits a response command additionally including the position level information to the power transmission side (step S84).

After transmitting the response command, the power receiving side turns on the transistor TB2 of the power feeding control section 48 (step S85) so as to start power supply to the load 90. The power receiving side also turns on the periodic authentication on so as to perform a periodic load modulation (step S86). Specifically, the transistor TB3 of the load modulation section 46 is turned on/off in accordance with a predetermined pattern in the periodic authentication period.

Next, the power receiving side determines whether or not a power transmission stop request (the STOP command) is received from the host 4 on the power receiving side (step S87). The power receiving side also determines whether or not an interruption request (the INT command) is received from the host 4 on the power receiving side (step S88). Further, the power receiving side determines whether or not the communication request command (the OUT/IN transfer commands) is received from the host 2 on the power transmission side (step S89).

If there is no reception of the command or the request, the power receiving side detects whether or not the battery 94 is fully charged (step S90). If the full charge is not detected, the processing flow returns to the step S87. On the other hand, if the full charge is detected, the transistor TB2 is turned off (step S91), and the power supply to the load 90 is stopped. Further, the periodic authentication is turned off (step S92). Then, the full charge detection command (a save frame) that notifies the detection of the full charge is transmitted to the power transmission side (step S93). After a wait period of k5 seconds (step S94), the processing flow returns to the step S93 so as to repeat the processing.

If the power transmission side starts the power transmission for confirming a recharge (temporary power transmission), a power-on-reset is performed on the power receiving side. Then, the negotiation processing and the setup processing are performed. Receiving the recharge confirmation command transmitted from the power transmission side (refer to the step S61), at the command branch of the step S81, the processing flow moves to processings for the recharge confirmation mode.

Specifically, the power receiving side checks a battery voltage (step S95), and transmits a response command of the recharge confirmation command and a check result of the battery voltage to the power transmission side (step S96). Then, the power transmission for confirming a recharge is stopped, the power receiving side is turned off.

If it is determined that the power transmission stop request and the interruption request are received from the host 4 in the steps S87, S88, and the communication request command is received in the step S89, the power receiving side turns off the transistor TB2 for power feeding and the periodic authentication (step S97). Then, the power receiving side switches the transmission condition and the communication condition to the communication mode condition (step S98), and the processing flow moves to the command branch of the step S81.

For example, if it is determined that the communication request command (the OUT/IN transfer commands) is received from the power transmission side in the step S89, at the command branch of the step S81, the processing flow is split into processings for a communication mode by the communication request from the power transmission side. Then, the power receiving side performs an arbitrary communication sequence based on an agreement between the hosts 2 and 4 (step S102). That is, transmitting and receiving of command, data, and handshake is performed. Then, the power receiving side determines whether or not the required number of data is obtained (step S103). If the required number of data is obtained, the power receiving side determines whether or not the normal power transmission start command transmitted from the power transmission side (refer to the step S71) is received (step S104). If the command is received, the processing flow moves to the step S83, and the power receiving side returns to the normal power transmission mode (a charge mode) from the communication mode.

If it is determined that the interruption request is received from the host 4 on the power receiving side in the step 88, at the command branch of the step S81, the processing flow is split into processings for a communication mode by the interruption request from the power receiving side. In the communication mode by the interruption request from the power receiving side, the communication request command (the INT command) is transmitted to the power transmission side (step S99). Then, the power receiving side determines whether or not the normal power transmission start command is received from the power transmission side (step S100). If the command is not received, the power receiving side determines whether or not the AKC command (refer to the step S74) is received (step S101). If the command is received, the processing flow moves to the processings for the communication mode in the steps S102, S103.

If it is determined that the power transmission stop requested is received from the host 4, on the power receiving side, in the step S87, at the command branch of the step S81, the processing flow is split into processing by the power transmission stop request. Then, the power transmission stop command is transmitted to the power transmission side (step S105). When the power transmission is stopped, the power receiving side is turned off.

10. Periodic Authentication

The periodic authentication will now be described. In the periodic authentication, a load on the power receiving side is intermittently varied in each periodic authentication period of the normal power transmission, and the intermittent load fluctuation is detected on the power transmission side so as to detect a so-called takeover state by a foreign object.

That is, the negotiation processing and the set up processing end, and subsequently normal power transmission (main transmission) starts. After the start of the normal power transmission, for example, a metal foreign object having a large area may be inserted between the primary coil L1 and the secondary coil L2. A metal object having a small or a medium area can be detected by monitoring the induced voltage signal of the primary coil L1. However, if the metal object having a large are is inserted, the power transmission side considers the metal object as a load such as the main load. Therefore, since the negotiation processing and the like are completed, the power transmission side considers the metal foreign object as a load, and continues the power transmission. Then, power transmission energy from the power transmission side is continuously expended on the metal foreign object. This causes a problem such that the metal foreign object is heated to high-temperature. In the embodiment, such phenomenon is called a "takeover state" that the original apparatus on the power receiving side is replaced by the metal foreign object having a large area and the like, and the power is continuously transmitted to the foreign object.

Figure 19:
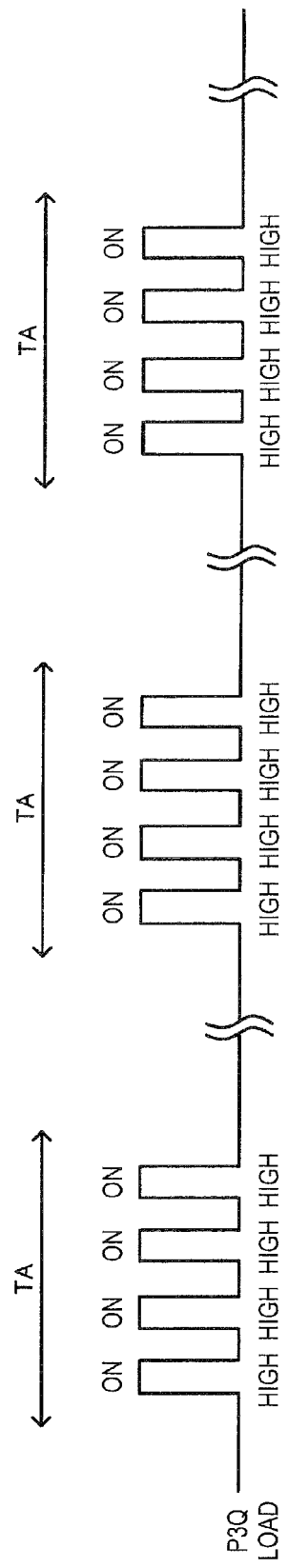
FIG. 19 is an explanatory diagram of periodic authentication.

In order to detect such the takeover state, a load on the power receiving side is intermittently varied in a periodic authentication period TA in FIG. 19. Specifically, a load modulation signal P3Q is intermittently varied so that the transistor TB3 of the load modulation section 46 is intermittently turned on/off. When the transistor TB3 is turned on, the power receiving side is relatively in a high load state (small impedance). On the other hand, when the transistor TB3 is turned off, the power receiving side is relatively in a low load state (high impedance). The load state detection circuit 30, on the power transmission side, detects the intermittent load fluctuation of the power receiving side. For example, a variation of the pulse width period of the coil terminal signal is detected so as to detect the load fluctuation of the power receiving side. For example, the low load state and the high load state are determined by using the thresholds LEVL and LEVH.

While the embodiment has been described in detail above, it will be understood by those skilled in the art that a number of modifications can be made to this embodiment without substantially departing from new matters and advantages of this invention. Therefore, it is to be noted that these modifications are all included in the scope of the invention. For example, terms referred to as different terms having broader meanings or having the same definitions of the terms in the specification and drawings can be replaced with the different terms in any part of the specification and drawings. Further, combinations of the embodiment and the modifications can be included in the scope of the invention. Also, the configurations and the operations of the power transmission control device, the power transmission device, the power receiving control device, and the power receiving device, the setup processing of register information, the authentication processing, the power transmission/power receiving control, the communication processing, the host interface processing, and the method for detecting a load state are not limited to what have been described in the embodiment, and various modifications can be made thereto.

What is claimed is:

1. A power transmission control device provided in a power transmission device included in a contactless power transmission system that transmits power by electromagnetically coupling a primary coil and a secondary coil from the power transmission device to a power receiving device so as to supply the power to a load on the power receiving device, the power transmission control device comprising:
   a controller that controls the power transmission control device; and
   a register section, the register section including:
      a power receiving side information register that stores power receiving side information received from the power receiving device; the power receiving side information register including a power receiving side transmission condition information register that stores power receiving side transmission condition information received from the power receiving device, and
      a power transmission side information register that stores power transmission side information, the power transmission side information register including a power transmission side transmission condition information register that stores power transmission side transmission condition information,
   wherein the controller performs at least one of: an authentication processing of the power receiving device; a power transmission control of the contactless power transmission; and a communication processing between the power transmission device and the power receiving device based on the power receiving side information stored in the power receiving side information register and the power transmission side information stored in the power transmission side register, and
   wherein before a start of normal power transmission, the controller performs the power transmission control based on the power transmission side transmission condition information stored in the power transmission side transmission condition information register while after the start of the normal power transmission, the controller performs the power transmission control based on the power receiving side transmission condition information stored in the power receiving side transmission condition information register.

2. The power transmission control device according to claim 1, wherein the power receiving side information register includes a power receiving side authentication information register that stores power receiving side authentication information received from the power receiving device, the power transmission side information register includes a power transmission side authentication information register that stores power transmission side authentication information, and the controller performs the authentication processing based on the power receiving side authentication information and the power transmission side authentication information.

3. The power transmission control device according to claim 2, wherein the power receiving side authentication information register stores power receiving side coil information, the power transmission side authentication information register stores power transmission side coil information, and the controller performs the authentication processing based on the power receiving side coil information and the power transmission side coil information.

4. The power transmission control device according to claim 1, wherein the controller performs the power transmission control after the start of the normal power transmission based on the power receiving side transmission condition information that is received from the power receiving device and stored in the power receiving side transmission condition information register before the start of the normal power transmission.

5. The power transmission control device according to claim 1, wherein the power receiving side information register includes a power receiving side communication condition information register that stores power receiving side communication condition information received from the power receiving device, the power transmission side information register includes a power transmission side communication condition information register that stores power transmission side communication condition information, and before a start of normal power transmission, the controller performs the communication processing based on the power transmission side communication condition information stored in the power transmission side communication condition information register while after the start of the normal power transmission, the controller performs the communication processing based on the power receiving side communication condition information stored in the power receiving side communication condition information register.

6. The power transmission control device according to claim 5, wherein the controller performs the communication processing after the start of the normal power transmission based on the power receiving side communication condition information that is received from the power receiving device and stored in the power receiving side communication condition information register before the start of the normal power transmission.

7. The power transmission control device according to claim 1, wherein the power receiving side information register includes a power receiving side corresponding function information register that stores power receiving side corresponding function information received from the power receiving device, the power transmission side information register includes a power transmission side corresponding function information register that stores power transmission side corresponding function information, and the controller performs a setup processing of a usage function based on the power receiving side corresponding function information stored in the power receiving side corresponding function information register and the power transmission side corresponding function information stored in the power transmission side corresponding function information register.

8. The power transmission control device according to claim 1, wherein in a test mode, the controller performs the authentication processing, the power transmission control, and the communication processing by using the power transmission side information stored in the power transmission side information register without using the power receiving side information stored in the power receiving side information register.

9. The power transmission control device according to claim 8, further comprising a host interface that communicates with a power transmission side host; and the power transmission side information register including a plurality of registers, at least one of the plurality of registers being set to be switchable between two states giving the power transmission side host a write-permission and a write-prohibition, the write being performed through the host interface.

10. A power transmission device, comprising:
the power transmission control device according to claim 1; and
a power transmission section that generates an alternating voltage and supplies the voltage to the primary coil.

11. An electronic apparatus, comprising:
the power transmission device according to claim 10.

12. A power receiving control device provided in a power receiving device included in a contactless power transmission system that transmits power by electromagnetically coupling a primary coil and a secondary coil from a power transmission device to the power receiving device so as to supply the power to a load on the power receiving device, the power receiving control device comprising:
a controller that controls the power receiving control device; and
a register section, the register section including:
    a power receiving side information register that stores power receiving side information, the power receiving side information register including a power receiving side authentication information register that stores power receiving side authentication information and power receiving side coil information; and
    a power transmission side information register that stores power transmission side information received from the power transmission device, the power transmission side information register including a power transmission side authentication information register that stores power transmission side authentication information received from the power transmission device and power transmission side coil information,
wherein the controller performs at least one of an authentication processing of the power transmission device and a communication processing between the power transmission device and the power receiving device based on the power receiving side information stored in the power receiving side information register and the power transmission side information stored in the power transmission side information register, and
the controller performs the authentication processing based on the power receiving side authentication information and power receiving side coil information and the power transmission side authentication information and power transmission side coil information.

13. The power receiving control device according to claim 12, wherein the power receiving side information register includes a power receiving side corresponding function information register that stores power receiving side corresponding function information, the power transmission side information register includes a power transmission side corresponding function information register that stores power transmission side corresponding function information received from the power transmission device, and the controller performs a setup processing of a usage function based on the power receiving side corresponding function information stored in the power receiving side corresponding function information register and the power transmission side corresponding function information stored in the power transmission side corresponding function information register.

14. A power receiving device, comprising:
the power receiving control device according to claim 12; and
a power receiving section that converts an induced voltage of the secondary coil into a direct current voltage.

15. An electronic apparatus, comprising:
the power receiving device according to claim 14; and
a load to which power is supplied by the power receiving device.

* * * * *